US012431158B2

(12) United States Patent
Sato et al.

(10) Patent No.: US 12,431,158 B2
(45) Date of Patent: Sep. 30, 2025

(54) SPEECH SIGNAL PROCESSING DEVICE, SPEECH SIGNAL PROCESSING METHOD, SPEECH SIGNAL PROCESSING PROGRAM, TRAINING DEVICE, TRAINING METHOD, AND TRAINING PROGRAM

(71) Applicant: NIPPON TELEGRAPH AND TELEPHONE CORPORATION, Tokyo (JP)

(72) Inventors: Hiroshi Sato, Tokyo (JP); Tsubasa Ochiai, Tokyo (JP); Keisuke Kinoshita, Tokyo (JP); Marc Delcroix, Tokyo (JP); Tomohiro Nakatani, Tokyo (JP); Atsunori Ogawa, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 814 days.

(21) Appl. No.: 17/635,354

(22) PCT Filed: Aug. 7, 2020

(86) PCT No.: PCT/JP2020/030523
§ 371 (c)(1),
(2) Date: Feb. 14, 2022

(87) PCT Pub. No.: WO2021/033587
PCT Pub. Date: Feb. 25, 2021

(65) Prior Publication Data

US 2022/0335965 A1 Oct. 20, 2022

(30) Foreign Application Priority Data

Aug. 16, 2019 (WO) .................. PCT/JP2019/032193

(51) Int. Cl.
*G10L 25/30* (2013.01)
*G10L 19/008* (2013.01)
*G10L 21/0272* (2013.01)

(52) U.S. Cl.
CPC ............ *G10L 25/30* (2013.01); *G10L 19/008* (2013.01); *G10L 21/0272* (2013.01)

(58) Field of Classification Search
CPC .... G10L 25/30; G10L 19/008; G10L 21/0272
See application file for complete search history.

(56) References Cited

U.S. PATENT DOCUMENTS

2017/0330586 A1* 11/2017 Roblek .................. G06N 3/084
2019/0080689 A1* 3/2019 Kagoshima ............. G10L 25/51

(Continued)

OTHER PUBLICATIONS

Delcroix et al. (2018) "Single Channel Target Speaker Extraction and Recognition with Speaker Beam" 2018 IEEE International Conference on Acoustics, Speech and Signal Processing (ICASSP), Apr. 15, 2018, pp. 5554-5558.

(Continued)

*Primary Examiner* — Bhavesh M Mehta
*Assistant Examiner* — Edward Tracy, Jr.

(57) ABSTRACT

An audio signal processing apparatus (10) includes a first auxiliary feature conversion unit (12) and a second auxiliary feature conversion unit (13) that convert a plurality of signals relating to processing of an audio signal of a target speaker into a plurality of auxiliary features for the plurality of signals using a plurality of auxiliary neural networks corresponding to the plurality of signals, and an audio signal processing unit (11) that estimates information regarding an audio signal of the target speaker included in a mixed audio signal using a main neural network based on an input feature of the mixed audio signal and the plurality of auxiliary features, wherein the plurality of signals relating to process- (Continued)

ing of the audio signal of the target speaker are two or more pieces of information of different modalities.

8 Claims, 14 Drawing Sheets

(56) References Cited

U.S. PATENT DOCUMENTS

2019/0311711 A1* 10/2019 Fazeldehkordi ...... G10L 15/063
2020/0335121 A1* 10/2020 Mosseri .................. G10L 15/25

OTHER PUBLICATIONS

Ephrat et al. (2018) "Looking to Listen at the Cocktail Party: A Speaker-Independent Audio-Visual Model for Speech Separation" ACM Trans. on Graphics, vol. 37, No. 4.

Ochiai et al. (2019) "Multimodal SpeakerBeam: Single channel target speech extraction with audio-visual speaker clues" Interspeech, Sep. 15, 2019.

* cited by examiner

SPEECH SIGNAL PROCESSING DEVICE, SPEECH SIGNAL PROCESSING METHOD, SPEECH SIGNAL PROCESSING PROGRAM, TRAINING DEVICE, TRAINING METHOD, AND TRAINING PROGRAM

CROSS-REFERENCE TO RELATED APPLICATIONS

This application is a U.S. National Stage Application filed under 35 U.S.C. § 371 claiming priority to International Patent Application No. PCT/JP2020/030523, filed on 7 Aug. 2020, which application claims priority to and the benefit of International Application No. PCT/JP2019/032193, filed on 16 Aug. 2019, the disclosures of which are hereby incorporated herein by reference in their entireties.

TECHNICAL FIELD

The present invention relates to an audio signal processing apparatus, an audio signal processing method, an audio signal processing program, a training apparatus, a training method, and a training program.

BACKGROUND ART

Development of technology for extracting an audio signal of a speaker of interest (a target speaker) from a mixed audio signal using a neural network is underway. Conventional neural networks in many target speaker extraction techniques have a configuration including a main neural network and an auxiliary neural network.

For example, the conventional target speaker extraction techniques extract auxiliary features by inputting prior information serving as a clue for the target speaker to the auxiliary neural network. Then, the conventional target speaker extraction techniques estimate mask information for extracting an audio signal of the target speaker included in a mixed audio signal that has been input using a main neural network based on the input mixed audio signal and auxiliary features. Using this mask information, the audio signal of the target speaker can be extracted from the input mixed audio signal.

Here, a method of inputting a pre-recorded audio signal of a target speaker to an auxiliary neural network as a clue for extracting audio of the target speaker (see, for example, NPL 1) and a method of inputting a video of a target speaker (mainly around the mouth) to an auxiliary neural network (see, for example, NPL 2) are known.

CITATION LIST

Non Patent Literature

NPL 1: M. Delcroix, K. Zmolikova, K. Kinoshita, A. Ogawa, and T. Nakatani, "SINGLE CHANNEL TARGET SPEAKER EXTRACTION AND RECOGNITION WITH SPEAKER BEAM," in Proc. of ICASSP' 18, pp. 5554-5558, 2018.

NPL 2: A. Ephrat, I. Mosseri., O. Lang, T. Dekel, K. Wilson, A. Hassidim, W. T. Freeman, and M. Rubinstein, "Looking to Listen at the Cocktail Party: A. Speaker-Independent Audio-Visual Model for Speech Separation," ACM Trans. On Graphics, Vol. 37, No. 4, 2018.

SUMMARY OF THE INVENTION

Technical Problem

Due to utilization of speaker characteristics in an audio signal, the technique described in NPL 1 has a problem that the extraction accuracy of auxiliary features is lowered if there are speakers with similar voice characteristics in the mixed audio signal. On the other hand, the technique described in NPL 2 is expected to run relatively robustly even for a mixed audio signal containing speakers with similar voices because language-related information derived from a video around the mouth is utilized.

Once the speaker clue (audio) in the technology described in NPL 1 is pre-recorded, auxiliary features can be extracted with stable quality. On the other hand, the quality of the speaker clue (video) in the technology described in NPL 2 varies greatly depending on movement of the speaker at each of times, thus causing a problem that it is not always possible to accurately extract the signal of the target speaker.

In the technique described in NPL 2, information on the movement of the speaker's mouth is not always obtained with a certain quality, for example, because the direction of the speaker's face changes or a part of the target speaker is hidden due to another speaker or object being displayed in the foreground of the target speaker. As a result, the technique described in NPL 2 may lower the mask estimation accuracy by estimating mask information based on auxiliary information obtained from poor quality video information.

The present invention has been made in view of the above and it is an object to provide an audio signal processing apparatus, an audio signal processing method, an audio signal processing program, a training apparatus, a training method, and a training program that can estimate an audio signal of a target speaker included in a mixed audio signal with stable accuracy.

Means for Solving the Problem

To solve the problems and achieve the object, an audio signal processing apparatus according to the present invention includes an auxiliary feature conversion unit configured to convert a plurality of signals relating to processing of an audio signal of a target speaker into a plurality of auxiliary features for the plurality of signals using a plurality of auxiliary neural networks, and an audio signal processing unit configured to estimate information regarding an audio signal of the target speaker included in a mixed audio signal using a main neural network based on an input feature of the mixed audio signal and the plurality of auxiliary features.

A training apparatus according to the present invention includes a selection unit configured to select a mixed audio signal for training and a plurality of signals relating to processing of an audio signal of a target speaker for training from training data, an auxiliary feature conversion unit configured to convert the plurality of signals relating to processing of the audio signal of the target speaker for training into a plurality of auxiliary features for the plurality of signals using a plurality of auxiliary neural networks, an audio signal processing unit configured to estimate information regarding processing of an audio signal of the target speaker included in the mixed audio signal for training using a main neural network based on a feature of the mixed audio signal for training and the plurality of auxiliary features, and an update unit configured to update parameters of neural networks and cause the selection unit, the auxiliary feature conversion unit, and the audio signal processing unit to repeatedly execute processing until a predetermined criterion is satisfied to set the parameters of the neural networks satisfying the predetermined criterion.

Effects of the Invention

According to the present invention, the audio signal of the target speaker included in the mixed audio signal can be estimated with stable accuracy.

DESCRIPTION OF EMBODIMENTS

Hereinafter, embodiments of an audio signal processing apparatus, an audio signal processing method, an audio signal processing program, a training apparatus, a training method, and a training program according to the present application will be described in detail with reference to the drawings. The present invention is not limited to the embodiments described below.

In the following, when "^A" is described with respect to A which is a vector, matrix, or scalar, it is assumed to be equivalent to "a symbol with "^" written immediately above "A".

First Embodiment

Audio Signal Processing Apparatus

First, an audio signal processing apparatus according to a first embodiment will be described. The audio signal processing apparatus according to the first embodiment generates auxiliary information by using video information of speakers at the time of recording an input mixed audio signal in addition to an audio signal of a target speaker. In other words, the audio signal processing apparatus according to the first embodiment has two auxiliary neural networks (a first auxiliary neural network and a second auxiliary neural network), in addition to a main neural network that estimates information regarding an audio signal of the target speaker included in the mixed audio signal, and an auxiliary information generation unit that generates one piece of auxiliary information using outputs of these two auxiliary neural networks.

Figure 1:
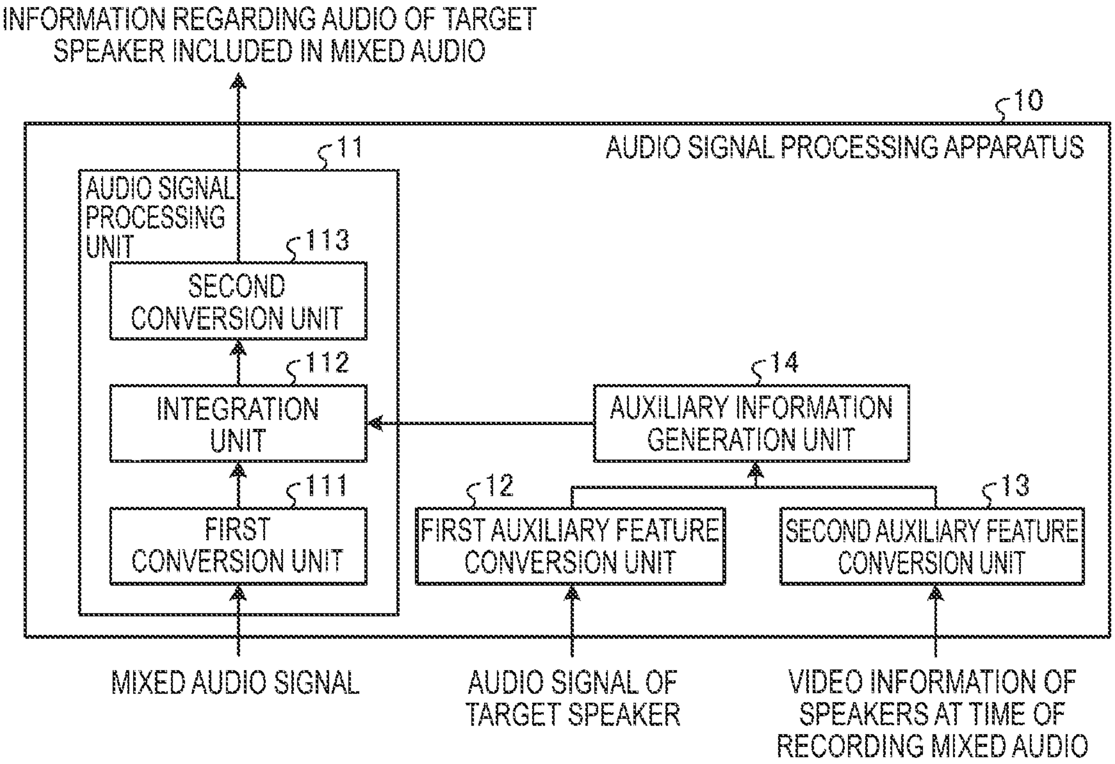
FIG. 1 is a diagram illustrating an example of a configuration of an audio signal processing apparatus according to a first embodiment.

FIG. 1 is a diagram illustrating an example of a configuration of the audio signal processing apparatus according to the first embodiment. The audio signal processing apparatus 10 according to the first embodiment is realized, for example, by a computer or the like, which includes a read only memory (ROM), a random access memory (RAM), a central processing unit (CPU), and the like, reading a predetermined program and the CPU executing the predetermined program.

As illustrated in FIG. 1, the audio signal processing apparatus 10 includes an audio signal processing unit 11, a first auxiliary feature conversion unit 12, a second auxiliary feature conversion unit 13, and an auxiliary information generation unit 14 (a generation unit). A mixed audio signal including audio from a plurality of sound sources is input to the audio signal processing apparatus 10. Further, an audio signal of a target speaker and video information of speakers at the time of recording the input mixed audio signal are input to the audio signal processing apparatus 10. Here, the audio signal of the target speaker is a signal obtained by recording what the target speaker utters independently in a different scene (place and time) from a scene in which the mixed audio signal is acquired. The audio signal of the target speaker does not include audio of other speakers, but may include background noise or the like. Further, the video information of speakers at the time of recording the mixed audio signal is a video containing at least the target speaker in the scene in which the mixed audio signal to be processed by the audio signal processing apparatus 10 is acquired, for example, a video capturing a state of the target speaker in the scene. The audio signal processing apparatus 10 estimates and outputs information regarding the audio signal of the target speaker included in the mixed audio signal.

The first auxiliary feature conversion unit 12 converts the audio signal of the target speaker of the input speaker into a first auxiliary feature $Z_s^A$ using the first auxiliary neural network. The first auxiliary neural network is a speaker clue extraction network (SCnet) trained to extract features from an input audio signal. The first auxiliary feature conversion unit 12 inputs the input audio signal of the target speaker to the first auxiliary neural network, which converts the input audio signal of the target speaker into the first auxiliary feature $Z_s^A$ and outputs the first auxiliary feature $Z_s^A$. For example, a series of amplitude spectrum features $C_s^A$ obtained by applying a short-time Fourier transform (SFTT) to an audio signal of the single target speaker recorded in advance is used as the audio signal of the target speaker. Here, s represents a speaker's index.

The second auxiliary feature conversion unit 13 uses the second auxiliary neural network to convert the video information of speakers at the time of recording the input mixed audio signal into the second auxiliary feature $Z_s^V$ (where $Z_s^V = z_{st}^V$; t=1, 2, . . . , T). The second auxiliary neural network is an SCnet trained to extract features from video information of a speaker. The second auxiliary feature conversion unit 13 inputs the video information of speakers at the time of recording the mixed audio signal to the second auxiliary neural network, which converts the video information of speakers at the time of recording the mixed audio signal into the second auxiliary feature $Z_s^V$ and outputs the second auxiliary feature $Z_s^V$.

For example, the same video information as in NPL 1 is used as the video information of speakers at the time of recording the mixed audio signal. Specifically, an embedding vector (a face embedding vector) $C_S^V$ corresponding to a face area of a target speaker obtained when extracting the face area of the target speaker from video information by using a model pretrained to extract a face area from a video is used as the video information of speakers at the time of recording the mixed audio signal. The embedding vector is, for example, a feature obtained using the Facenet of Reference 1. When frames of the video information differ from those of the mixed audio signal, frames of the video information are arranged repeatedly such that the number of frames matches. Reference 1: F. Schroff, D. Kalenichenko, and J. Philbin, "Facenet: A unified embedding for face recognition and clustering," in IEEE conf. on computer and pattern recognition (CVPR), pp. 815-823, 2015.

The auxiliary information generation unit 14 generates an auxiliary feature $Z_s^{AV}$ (where $Z_s^{AV} = z_{st}^{AV}$; t=1, 2, . . . , T) based on the first auxiliary feature $Z_s^A$ and the second auxiliary feature $Z_s^V$. T indicates the number of time frames. The auxiliary information generation unit 14 is realized by an attention mechanism that outputs a weighted sum of the first auxiliary feature $Z_s^A$ and the second auxiliary feature $Z_s^V$, multiplied by attentions, as an auxiliary feature as shown in equation (1).

[Math. 1]

$$z_{st}^{AV} = \underbrace{\sum_{\psi \in \{A,V\}} a_{st}^{\psi} z_{st}^{\psi}}_{Attention} \quad (t = 1, 2, \ldots, T) \tag{1}$$

Here, the attentions $\{\alpha^{\Psi}_{st}\}$ are pretrained by a method shown in Reference 2. Reference 2: D. Bahdanau, K. Cho, and Y. Bengio, "Neural machine translation by jointly learning to aligh and translate," in International Conf. on Learning Representations (ICLR), 2015.

The attentions $\{\alpha^{\Psi}_{st}\}_{\Psi \in \{A, V\}}$ are calculated as in equations (2) and (3) using the first intermediate feature $z^M_t$ of the mixed audio signal and the features $\{z^{\Psi}_{st}\}_{\Psi \in \{A, V\}}$ of the target speaker. w, W, V, and v are trained weight and bias parameters.

[Math. 2]

$$e_{st}^{\psi} = w\tanh\left(Wz_t^M + Vz_{st}^{\psi} + b\right) \tag{2}$$

[Math. 3]

$$a_{st}^{\psi} = \frac{\exp(\in e^{\psi})}{\sum_{\psi \in \{A,V\}} \exp(\in e^{\psi})} \tag{3}$$

The audio signal processing unit 11 uses a main neural network to estimate information regarding the audio signal of the target speaker included in the mixed audio signal. The information regarding the audio signal of the target speaker is, for example, mask information for extracting audio of the target speaker from the mixed audio signal or an estimation result of the audio signal itself of the target speaker included in the mixed audio signal. The audio signal processing unit 11 estimates information regarding the audio signal of the target speaker included in the mixed audio signal based on the input feature of the mixed audio signal, the first auxiliary feature obtained through conversion by the first auxiliary feature conversion unit 12, and the second auxiliary feature obtained through conversion by the second auxiliary feature conversion unit 13. The audio signal processing unit 11 includes a first conversion unit 111, an integration unit 112, and a second conversion unit 113.

The first conversion unit 111 converts the input mixed audio signal Y into a first intermediate feature $Z^M$ (where $Z_t^M = z_t^M$; t=1, 2, . . . , T) using a first main neural network and outputs the first intermediate feature $Z^M$. The first main neural network is a deep neural network (DNN) trained to convert a mixed audio signal into a first intermediate feature. For example, information obtained by applying an SFTT is used as the input mixed audio signal Y.

The integration unit 112 integrates the first intermediate feature $Z^M$ obtained through conversion by the first conversion unit 111 and the auxiliary information $Z_s^{AV}$ generated by the auxiliary information generation unit 14 to generate a second intermediate feature $I_s$ (where $I_s = i_{st}$; t=1, 2, . . . , T) as shown in equation (4).

[Math. 4]

$$i_{st} = z_t^M \odot z_{st}^{AV} (t=1,2, \ldots, T) \tag{4}$$

The second conversion unit 113 uses a second main neural network to estimate information regarding the audio signal of the target speaker included in the mixed audio signal. The second main neural network is a neural network that estimates mask information based on an input feature. The second conversion unit 113 takes the second intermediate feature $I_s$ as an input to the second main neural network and outputs an output of the second main neural network as information regarding the audio signal of the target speaker included in the mixed audio signal.

For example, the second neural network is composed of a trained DNN, a subsequent linear conversion layer, and an activation layer, and converts the second intermediate feature into a third intermediate feature through the DNN and then converts the third intermediate feature into a fourth intermediate feature through a linear conversion layer and applies a sigmoid function to the fourth intermediate feature to estimate information regarding the audio signal of the target speaker included in the mixed audio signal as an output.

When the information regarding the audio signal of the target speaker included in the mixed audio signal is mask information $M_s$, the mask information $M_s$ is applied to the mixed audio signal Y to obtain an audio signal $\hat{X}_s$ of the target speaker as in equation (5). It is also possible to configure a main neural network so as to directly output an estimation result $\hat{X}_s$ of the audio signal of the target speaker as information regarding the audio signal of the target speaker included in the mixed audio signal. This can be realized by changing the training method of the training apparatus which will be described later.

[Math. 5]

$$\hat{X}_s = M_s \odot Y \quad (5)$$

Training Apparatus

Figure 2:
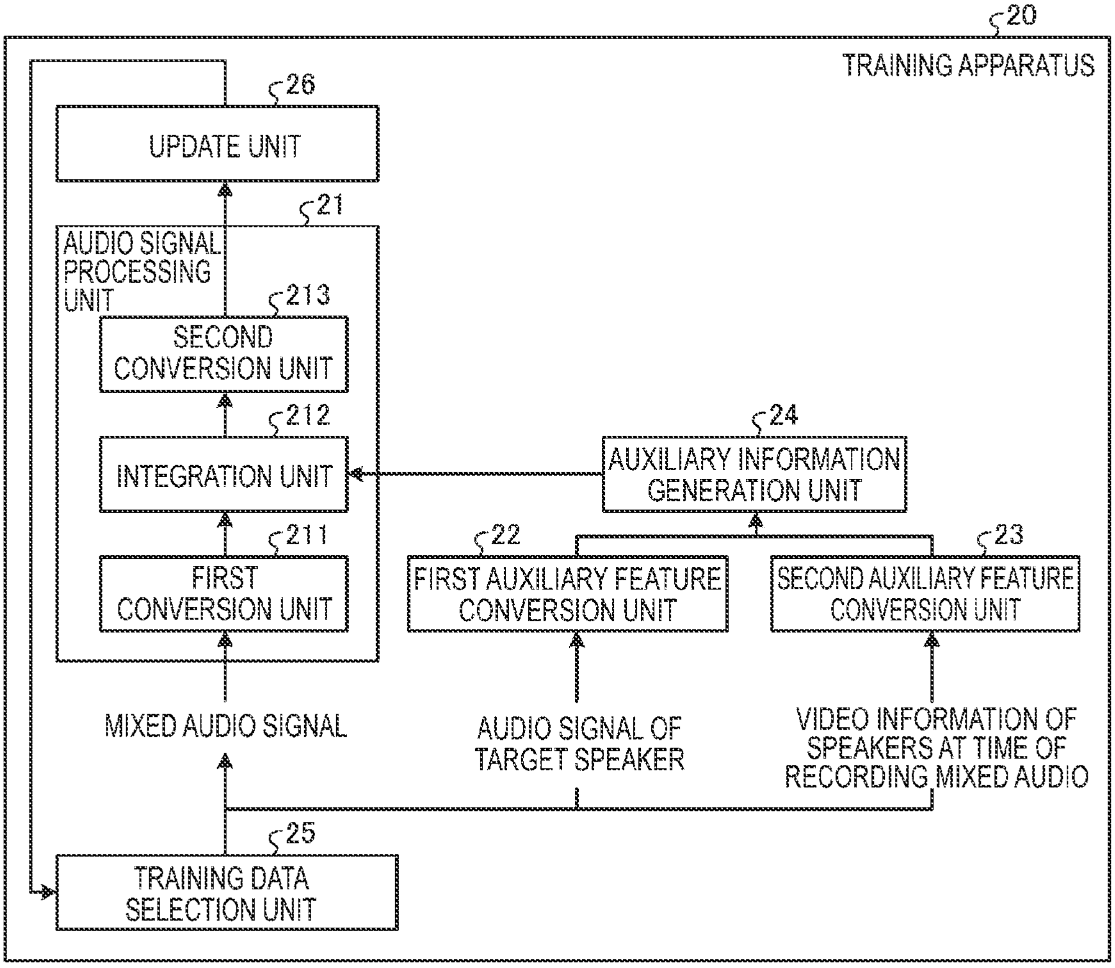
FIG. 2 is a diagram illustrating an example of a configuration of a training apparatus according to the first embodiment.

Next, a configuration of a training apparatus for training each neural network used in the audio signal processing apparatus 10 will be described. FIG. 2 is a diagram illustrating an example of the configuration of the training apparatus according to the first embodiment.

The training apparatus 20 according to the first embodiment is realized, for example, by a computer or the like, which includes a ROM, a RAM, a CPU, and the like, reading a predetermined program and the CPU executing the predetermined program. As illustrated in FIG. 2, the training apparatus 20 includes an audio signal processing unit 21, a first auxiliary feature conversion unit 22, a second auxiliary feature conversion unit 23, an auxiliary information generation unit 24, a training data selection unit 25, and an update unit 26. The audio signal processing unit 21 includes a first conversion unit 211, an integration unit 212, and a second conversion unit 213.

Each processing unit of the training apparatus 20 performs the same processing as the processing unit of the same name of the audio signal processing apparatus 10, except for the training data selection unit 25 and the update unit 26. A mixed audio signal, an audio signal of a target speaker, and video information of speakers at the time of recording the input mixed audio signal, which are input to the training apparatus 20, are training data and it is assumed that the audio signal of the single target speaker included in the mixed audio signal is known. Appropriate initial values are preset for the parameters of each neural network of the training apparatus 20.

The training data selection unit 25 selects a set of a mixed audio signal for training, an audio signal of a target speaker, and video information of speakers at the time of recording the mixed audio signal for training from training data. The training data is a data set including a plurality of sets of a mixed audio signal, an audio signal of a target speaker, and video information of speakers at the time of recording the mixed audio signal, which are prepared in advance for training. Then, the training data selection unit 25 inputs the mixed audio signal for training, the audio signal of the target speaker, and the video information of speakers at the time of recording the mixed audio signal for training, which have been selected, to the first conversion unit 211, the first auxiliary feature conversion unit 22, and the second auxiliary feature conversion unit 23, respectively.

The update unit 26 performs parameter training of each neural network. The update unit 26 causes the main neural network to perform multitask training with the first and second auxiliary neural networks. The update unit 26 can also cause each neural network to execute single-task training. As shown in an evaluation experiment which will be described later, when the update unit 26 causes each neural network to perform multitask training, the audio signal processing apparatus 10 can maintain high accuracy even when only one of the audio signal of the target speaker and the video information of speakers at the time of recording the mixed audio signal has been input.

Specifically, the update unit 26 updates parameters of each neural network and causes the training data selection unit 25, the first auxiliary feature conversion unit 22, the second auxiliary feature conversion unit 23, and the auxiliary information generation unit 24, and the audio signal processing unit 21 to repeatedly execute processing until a predetermined criterion is satisfied to set parameters of each neural network satisfying the predetermined criterion. The values of parameters of each neural network set in this way are applied as parameters of each neural network in the audio signal processing apparatus 10. The update unit 26 updates the parameters using a well-known method of updating parameters such as an error back propagation method.

The predetermined criterion is, for example, that a predetermined number of repetitions is reached. The predetermined criterion may also be that an update amount by which the parameters are updated is less than a predetermined value. Alternatively, the predetermined criterion may be that the value of a loss function $L_{MTL}$ calculated for parameter update is less than a predetermined value.

Here, a weighted sum of a first loss $L_{AV}$, a second loss $L_A$, and a third loss $L_V$ is used as the loss function $L_{MTL}$ as shown in equation (6). Each loss is the distance between an estimation result of an audio signal of a target speaker included in a mixed audio signal (an estimated speaker audio signal) and a correct audio signal of the target speaker (a teacher signal) in training data. The first loss $L_{AV}$ is a loss when an estimated speaker audio signal is obtained using both the first and second auxiliary neural networks. The second loss $L_A$ is a loss when an estimated speaker audio signal is obtained using only the first auxiliary neural network. The third loss $L_V$ is a loss when an estimated speaker audio signal is obtained using only the second auxiliary neural network.

[Math. 6]

$$L_{MTL} = \alpha L_{AV} + \beta L_A + \gamma L_V \quad (6)$$

Weights α, β, and γ of the losses are set such that at least one or more of the weights are non-zero. Thus, one of the weights α, β, and γ may be set to 0, such that the corresponding loss is not considered.

Here, in the description of the embodiment of the audio signal processing apparatus, it has been mentioned that "information regarding the audio signal of the target speaker included in the mixed audio signal" which is the output of the main neural network may be mask information for extracting audio of the target speaker from the mixed audio signal or may be an estimation result of the audio signal itself of the target speaker included in the mixed audio signal.

Each loss described above is calculated as follows when the neural networks are trained such that the output of the main neural network is mask information. Here, the output of the main neural network in the present training apparatus is regarded as an estimation result of the mask information, the estimated mask information is applied to the mixed audio signal to obtain an estimated speaker audio signal as in equation (5), and the distance between the estimated speaker audio signal and a teacher signal is taken as the loss described above.

When the neural networks are trained such that the output of the main neural network is an estimation result of the audio signal of the target speaker included in the mixed audio signal, the output of the main neural network in the present training apparatus is regarded as an estimated speaker audio signal to calculate the loss described above.

As described above, parameters of the first auxiliary neural network, parameters of the second auxiliary neural network, and parameters of the main neural network are trained by being updated such that a weighted sum of a first loss, a second loss, and a third loss described below decreases. The first loss is a loss for an estimated speaker audio signal that the audio signal processing unit 11 has estimated using a feature of a mixed audio signal for training, a first auxiliary feature, and a second auxiliary feature obtained through conversion of video information of speakers at the time of recording the mixed audio signal for training. The second loss is a loss for an estimated speaker audio signal that the audio signal processing unit 11 has estimated based on a feature of a mixed audio signal for training and a first auxiliary feature. The third loss is a loss for an estimated speaker audio signal that the audio signal processing unit 11 has estimated based on a feature of a mixed audio signal for training and a second auxiliary feature.

Processing Procedure for Audio Signal Processing

Figure 3:
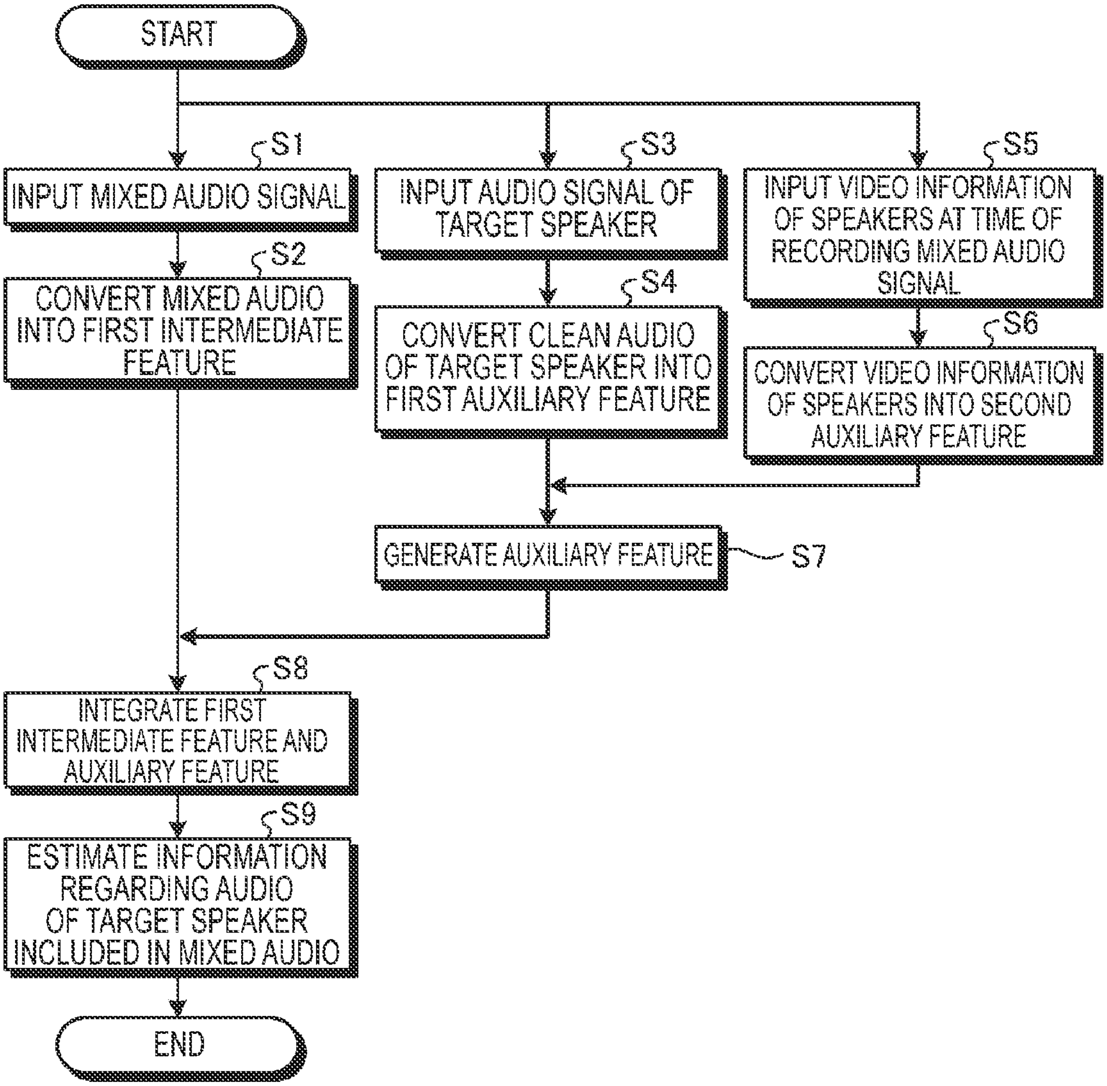
FIG. 3 is a flowchart illustrating a processing procedure for audio signal processing according to the first embodiment.

Next, a flow of audio signal processing executed by the audio signal processing apparatus 10 will be described. FIG. 3 is a flowchart showing a processing procedure for audio signal processing according to the embodiment.

As shown in FIG. 3, the audio signal processing apparatus 10 receives as inputs a mixed audio signal, an audio signal of a target speaker, and video information of speakers at the time of recording the input mixed audio signal (steps S1, S3, and S5).

The first conversion unit 111 converts the input mixed audio signal Y into a first intermediate feature using the first main neural network (step S2). The first auxiliary feature conversion unit 12 converts the audio signal of the target speaker of the input speaker into a first auxiliary feature using the first auxiliary neural network (step S4). The second auxiliary feature conversion unit 13 converts the video information of speakers at the time of recording the input mixed audio signal into a second auxiliary feature using the second auxiliary neural network (step S6). The auxiliary information generation unit 14 generates an auxiliary feature based on the first auxiliary feature and the second auxiliary feature (step S7).

The integration unit 112 integrates the first intermediate feature obtained through conversion by the first conversion unit 111 and the auxiliary information generated by the auxiliary information generation unit 14 to generate a second intermediate feature (step S8). The second conversion unit 113 converts the second intermediate feature that has been input into information regarding the audio signal of the target speaker included in the mixed audio signal using the second main neural network (step S9).

Processing Procedure for Training Processing

Figure 4:
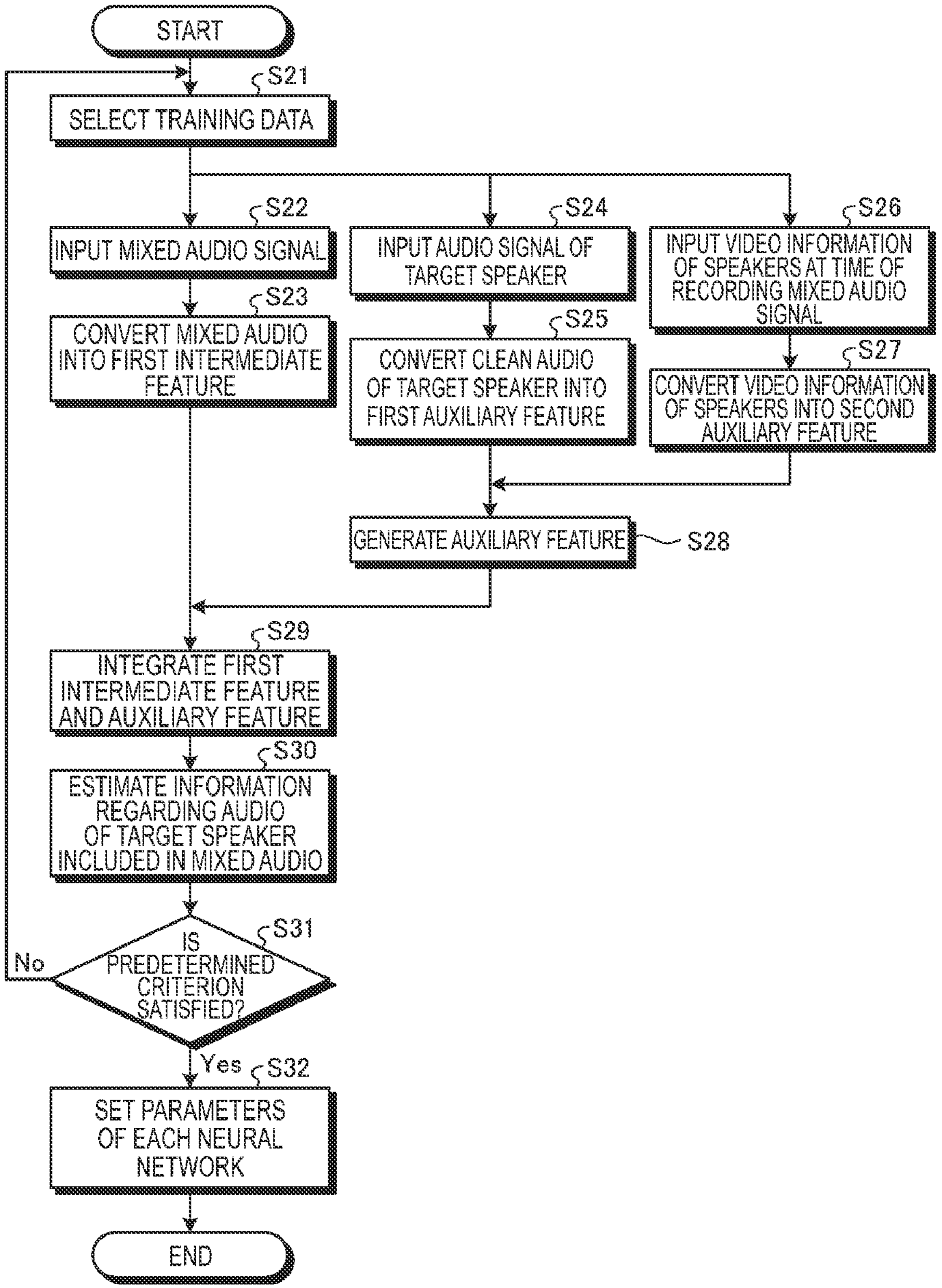
FIG. 4 is a flowchart illustrating a processing procedure for training processing according to the first embodiment.

Next, a flow of training processing executed by the training apparatus 20 will be described. FIG. 4 is a flowchart showing a processing procedure for the training processing according to the embodiment.

As illustrated in FIG. 4, the training data selection unit 25 selects a set of a mixed audio signal for training, an audio signal of a target speaker, and video information of speakers at the time of recording the mixed audio signal for training from training data (step S21). The training data selection unit 25 inputs the mixed audio signal for training, the audio signal of the target speaker, and the video information of speakers at the time of recording the mixed audio signal for training, which have been selected, to the first conversion unit 211, the first auxiliary feature conversion unit 22, and the second auxiliary feature conversion unit 23, respectively (steps S22, S24, and S26). Steps S23, S25, and S27 to S30 are the same processing operations as steps S2, S4, and S6 to S9 shown in FIG. 3.

The update unit 26 determines whether or not a predetermined criterion is satisfied (step S31). When the predetermined criterion is not satisfied (step S31: No), the update unit 26 updates the parameters of each neural network and the processing returns to step S21 to cause the training data selection unit 25, the first auxiliary feature conversion unit 22, and the second auxiliary feature conversion unit 23, the auxiliary information generation unit 24, and the audio signal processing unit 21 to repeatedly execute processing. When the predetermined criterion is satisfied (step S31: Yes), the update unit 26 sets parameters satisfying the predetermined criterion as trained parameters of each neural network (step S32).

Evaluation Experiment

A simulation data set of mixed audio signals based on a lip reading sentences 3 (LRS3)-TED audio-video corpus was generated for evaluation. The data set includes mixed audio signals of two speakers generated by mixed utterances at a signal to noise ratio (SNR) of 0.5 dB. In this evaluation, information obtained by applying a short-time Fourier transform (STFT) to a mixed audio signal was used as an input mixed audio signal Y. In this evaluation, an amplitude spectrum feature obtained by applying an STFT to an audio signal with a window length of 60 ms and a window shift of 20 ms was used as an audio signal of a target speaker. In this evaluation, an embedding vector corresponding to a face area of a target speaker extracted from each video frame (at 25 fps, for example, with a 30 ms shift) using the Facenet was used as video information.

First, Table 1 shows the results of comparing the accuracies of audio signal processing of conventional methods and the method of the embodiment.

TABLE 1

SDR (dB) for evaluated methods with audio-only, visual-only, and audio-visual speaker clues.

| | Method | | |
|---|---|---|---|
| | Diff | Same | All |
| Mixture | 0.5 | 0.5 | 0.5 |
| Baseline-A | 9.8 | 6.8 | 8.3 |
| Baseline-V | 9.4 | 7.1 | 8.3 |
| SpeakerBeam-AV | 10.7 | 9.1 | 9.9 |

In Table 1, "Baseline-A" is a conventional audio signal processing method that uses auxiliary information based on audio information, "Baseline-V" is a conventional audio signal processing method that uses auxiliary information based on video information, and "Speaker Beam-AV" is an audio signal processing method according to the present embodiment which uses two pieces of auxiliary information based on audio information and video information. Table 1 shows a signal-to-distortion ratio (SDR) for an audio signal of a target speaker extracted from a mixed audio signal using each of these methods. "Same" indicates that the target speaker and other speakers have the same gender. "Diff" indicates that the target speaker and other speakers have different genders. "All" indicates an average SDR of all mixed audio signals.

As shown in Table 1, SpeakerBeam-AV showed better results than the conventional Baseline-A and Baseline-V under all conditions. In particular, regarding the results of the Same condition which tended to be less accurate than in the conventional methods, SpeakerBeam-AV showed a result of an accuracy closer to the result of the Diff condition, which was very good compared to the conventional methods.

Next, the accuracy of audio signal processing in the training method according to the first embodiment was evaluated depending on whether or not multitask training was executed. Table 2 shows the results of comparing the accuracies of audio signal processing when multitask training was executed and when single-task training was executed instead of multitask training in the training method according to the first embodiment.

TABLE 2

SDR (dB) for proposed method without and with multitask learning.

| Method | Weights $\{\alpha, \beta, \gamma\}$ | Clues AV | Clues A | Clues V |
|---|---|---|---|---|
| SpeakerBeam-AV | {1.0, 0.0, 0.0} | 9.9 | 6.7 | 1.1 |
| SpeakerBeam-AV-MTL | {0.8, 0.1, 0.1} | 9.9 | 8.6 | 9.0 |

"Speaker Beam-AV" indicates an audio signal processing method in which training based on single tasking is executed for each neural network of the audio signal processing apparatus 10 and "Speaker Beam-AV-MTL" indicates an audio signal processing method in which training based on multitasking is executed for each neural network of the audio signal processing apparatus 10. $\{\alpha, \beta, \gamma\}$ are the weights $\alpha$, $\beta$, and $\gamma$ of the losses in equation (6). "AV" of "Clues" indicates the case where both an audio signal of a target speaker and video information of speakers at the time of recording a mixed audio signal are input as auxiliary information, "A" indicates the case where only an audio signal of a target speaker is input as auxiliary information, and "V" indicates the case where only video information of speakers at the time of recording a mixed audio signal is input as auxiliary information.

As shown in Table 2, SpeakerBeam-AV can maintain a certain degree of accuracy when both an audio signal of a target speaker and video information of speakers at the time of recording a mixed audio signal are input as auxiliary information. However, SpeakerBeam-AV cannot maintain the accuracy when only one of an audio signal of a target speaker and video information of speakers at the time of recording a mixed audio signal is input as auxiliary information.

On the other hand, SpeakerBeam-AV-MTL can also maintain a certain degree of accuracy when only one of audio of a target speaker and video information of speakers at the time of recording a mixed audio signal is input as auxiliary information. SpeakerBeam-AV-MTL also maintains higher accuracy than the conventional Baseline-A and Baseline-V (see Table 1) when only one of audio of a target speaker and video information of speakers at the time of recording a mixed audio signal is input as auxiliary information.

SpeakerBeam-AV-MTL also exhibits the same accuracy as SpeakerBeam-AV when both an audio signal of a target speaker and video information of speakers at the time of recording a mixed audio signal are input as auxiliary information. Thus, no matter whether both an audio signal of a target speaker and video information of speakers at the time of recording a mixed audio signal are input as auxiliary information (AV), only an audio signal of a target speaker is input as auxiliary information (A), or only video information of speakers at the time of recording a mixed audio signal is input as auxiliary information (V), a system to which SpeakerBeam-AV-MTL is applied can perform audio signal processing with high accuracy simply by switching to the corresponding mode.

Advantages of First Embodiment

The audio signal processing apparatus 10 according to the first embodiment uses a first auxiliary feature, into which an audio signal of a target speaker has been converted using a first auxiliary neural network, and a second auxiliary feature, into which video information of speakers at the time of recording an input mixed audio signal has been converted using a second auxiliary neural network, as auxiliary information to estimate mask information for extracting an audio signal of the target speaker included in the mixed audio signal.

The audio signal processing apparatus 10 can estimate the mask information with stable accuracy because it estimates the mask information using both the first auxiliary feature which enables extraction of an auxiliary feature with stable quality and a second auxiliary feature which is robust to a mixed audio signal containing speakers with similar voices as described above.

In addition, the training apparatus 20 according to the first embodiment causes each neural network to perform multitask training, such that the audio signal processing apparatus 10 can maintain high accuracy even when only one of an audio signal of a target speaker and video information of speakers at the time of recording a mixed audio signal is input as shown in the results of the evaluation experiment.

Thus, according to the first embodiment, the mask information for extracting an audio signal of a target speaker included in a mixed audio signal can be estimated with stable accuracy.

Second Embodiment

Here, signals used for auxiliary information are not limited to the two signals, one being an audio signal of a target speaker, the other being video information of speakers at the time of recording a mixed audio signal, and may be a plurality of signals relating to extraction of an audio signal of a target speaker. A plurality of signals relating to processing of an audio signal of a target speaker are signals acquired from a scene in which a mixed audio signal is uttered or acquired from the target speaker. The second and subsequent embodiments will be described with respect to an example where other information serving as a clue for a target speaker, in addition to an audio signal of the target speaker and video information of speakers at the time of recording a mixed audio signal, are used as signals relating to processing of the audio signal of the target speaker used for auxiliary information.

Here, it is expected that use of the attentions described in the first embodiment makes it possible to selectively use which of information to be used at each time out of the plurality of signals (clue information) relating to processing of an audio signal of a target speaker, for example, based on the reliability of the clue information. On the other hand, in the multi-modal target speaker extraction using the attentions described in the first embodiment, the attention mechanism is not trained so as to capture the reliabilities of clues and thus may sometimes fail to achieve a "behavior of distributing modalities that are selectively used" as expected. As a result, there may be no difference in performance between the case where clues aggregate using the attention mechanism and the case where clues aggregate as a sum or combination of vectors without using the attention mechanism.

It was found that one reason why the attention mechanism did not work as expected was due to a phenomenon of the norms of the vectors of auxiliary features of modalities being significantly unbalanced between the modalities before the modal aggregation. The phenomenon of the norms of modalities not being uniform impairs interpretability regarding whether the weights of attentions for aggregating the modalities in the form of a weighted sum are used equally in all modalities at a certain time or are emphasized in one modality at a certain time.

Thus, the second embodiment newly proposes a training apparatus having a mechanism called "normalized attention" in which a normalization mechanism is added to attention.

Training Apparatus

Figure 5:
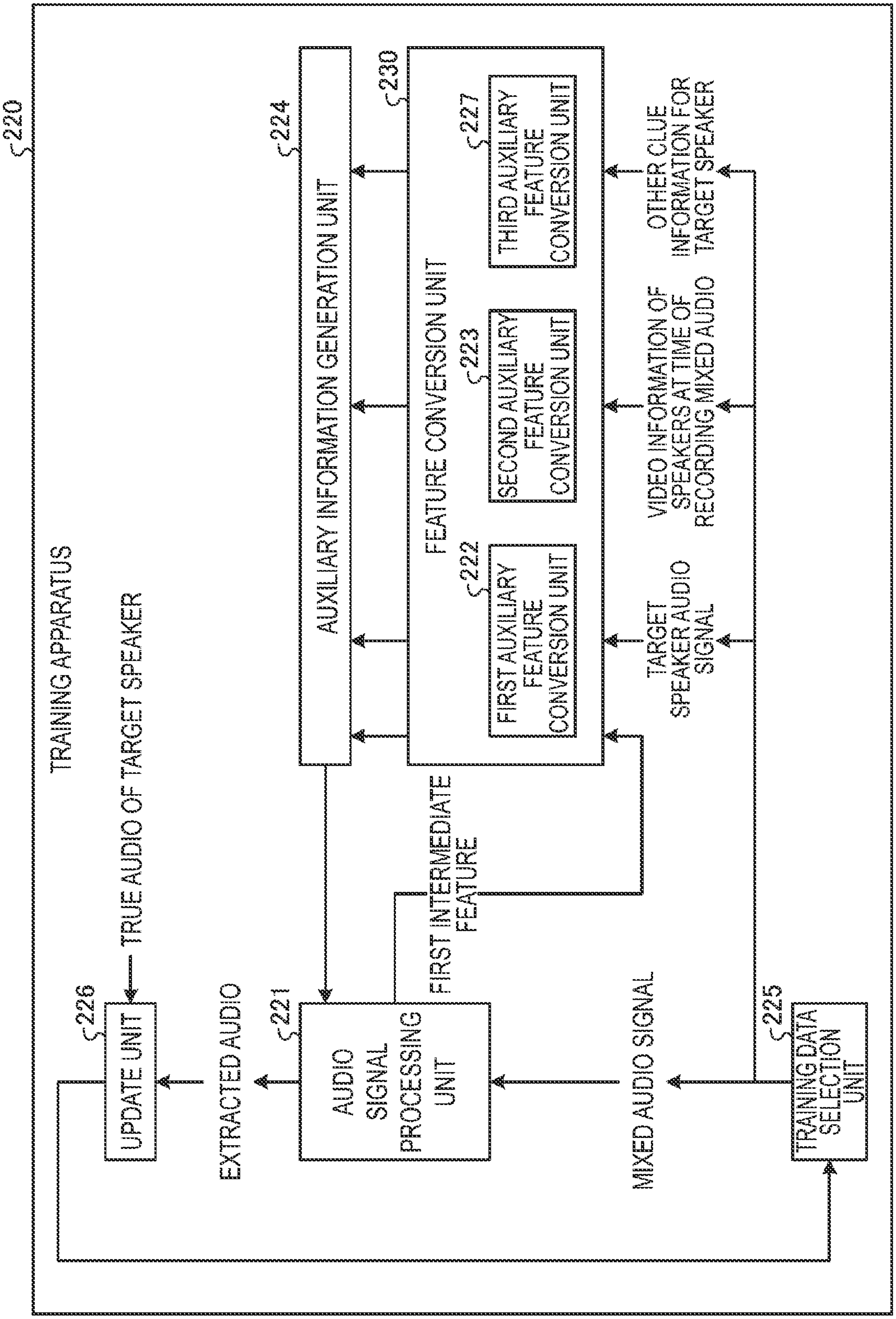
FIG. 5 is a diagram illustrating an example of a configuration of a training apparatus according to a second embodiment.

FIG. 5 is a diagram illustrating an example of a configuration of a training apparatus according to the second embodiment. The training apparatus 220 according to the second embodiment is realized, for example, by a computer or the like, which includes a ROM, a RAM, a CPU, and the like, reading a predetermined program and the CPU executing the predetermined program. As illustrated in FIG. 5, the training apparatus 220 includes a feature conversion unit 230, an audio signal processing unit 221, an auxiliary information generation unit 224, a training data selection unit 225, and an update unit 226.

Other clue information for the target speaker, in addition to the audio signal of the target speaker of the input speaker and video information of speakers at the time of recording a mixed audio signal, are input to the feature conversion unit 230 as a plurality of signals relating to processing of the audio signal of the target speaker. Examples of the other clue information for the target speaker include information on the position of the target speaker with respect to recording equipment in the scene where the mixed audio signal is uttered, the direction of the speaker, and sensor information acquired from the target speaker in the scene where the mixed audio signal is uttered. The sensor information is, for example, biological information such as heartbeat or myoelectricity obtained by a sensor of a wearable device. The heartbeat increases, for example, when the wearer utters. The plurality of signals relating to processing of the audio signal of the target speaker include any two or more of an audio signal produced when the target speaker utters independently at a different time from the mixed audio signal, video information of speakers in the scene where the mixed audio signal is uttered, information on the position of the target speaker with respect to the recording equipment in the scene where the mixed audio signal is uttered, sensor information acquired from the target speaker in the scene where the mixed audio signal is uttered, and the like.

The feature conversion unit 230 converts the plurality of signals relating to processing of the audio signal of the target speaker into a plurality of auxiliary features for the plurality of signals using a plurality of auxiliary neural networks corresponding to the plurality of signals. For example, the feature conversion unit 230 converts pieces of clue information that have been input into respective auxiliary features based on the first intermediate feature obtained by converting the mixed audio signal for training using the first main neural network and the pieces of input clue information. The feature conversion unit 230 includes a first auxiliary feature conversion unit 222, a second auxiliary feature conversion unit 223, and a third auxiliary feature conversion unit 227.

Similar to the first auxiliary feature conversion unit 22, the first auxiliary feature conversion unit 222 converts the audio signal of the target speaker of the input speaker into a first auxiliary feature $Z_s^A$ using a first auxiliary neural network. Similar to the second auxiliary feature conversion unit 23, the second auxiliary feature conversion unit 223 converts the video information of speakers at the time of recording the input mixed audio signal into a second auxiliary feature $Z_s^V$ using a second auxiliary neural network. The third auxiliary feature conversion unit 227 converts the input other clue information for the target speaker into a third auxiliary feature $Z_s^H$ (where $Z_s^H = z_{st}^H$; t=1, 2, . . . , T) using a third auxiliary neural network.

Figure 6:
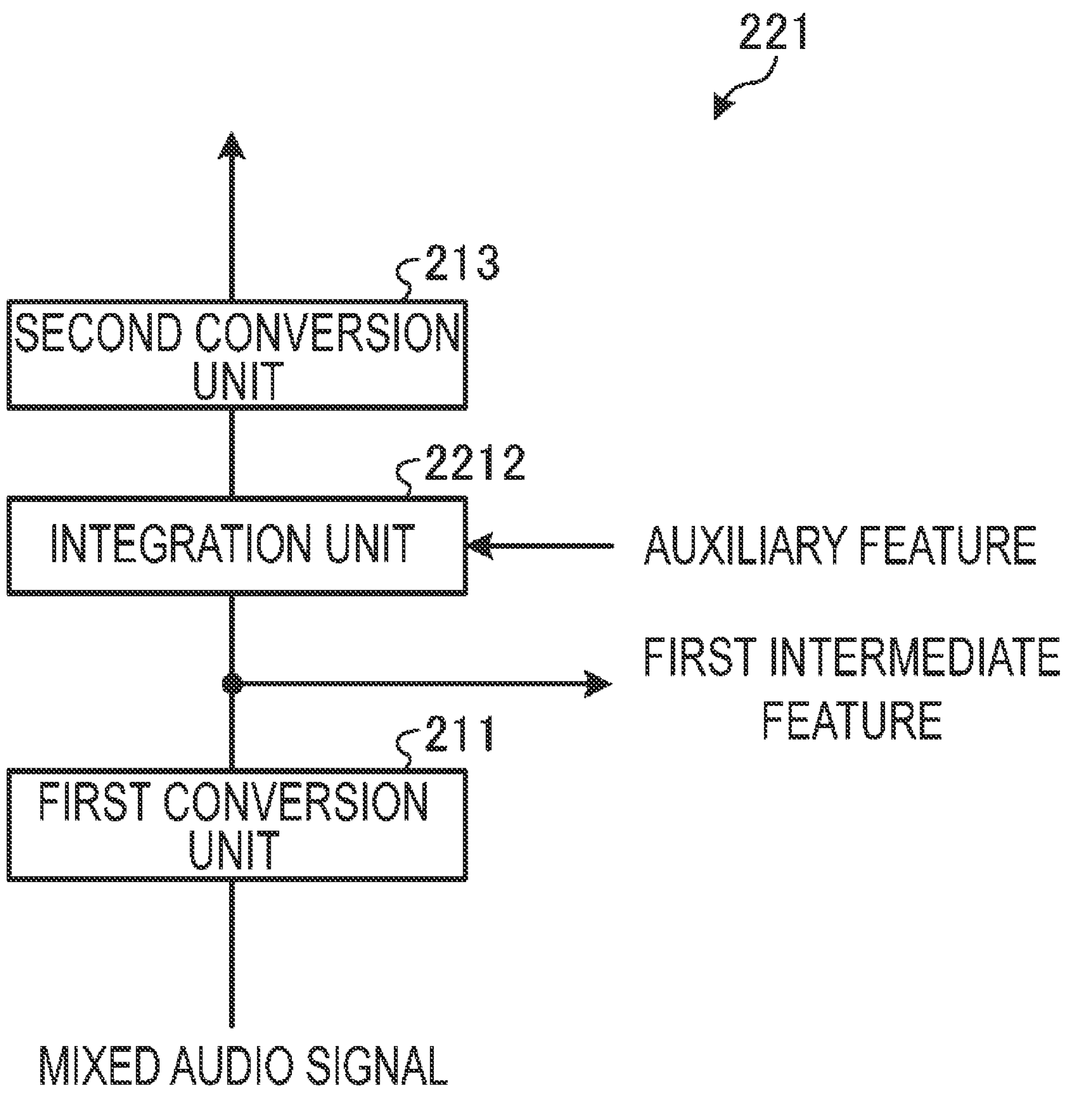
FIG. 6 is a diagram illustrating an example of an audio signal processing unit illustrated in FIG. 5.

Similar to the audio signal processing unit 21, the audio signal processing unit 221 uses a main neural network to estimate information regarding the audio signal of the target speaker included in the mixed audio signal for training. FIG. 6 is a diagram illustrating an example of the audio signal processing unit 221 illustrated in FIG. 5. The audio signal processing unit 221 includes a first conversion unit 211, an integration unit 2212, and a second conversion unit 213. The integration unit 2212 integrates the first intermediate feature obtained through conversion by the first conversion unit 211 and an auxiliary feature generated by the auxiliary information generation unit 224 to generate a second intermediate feature.

Figure 7:
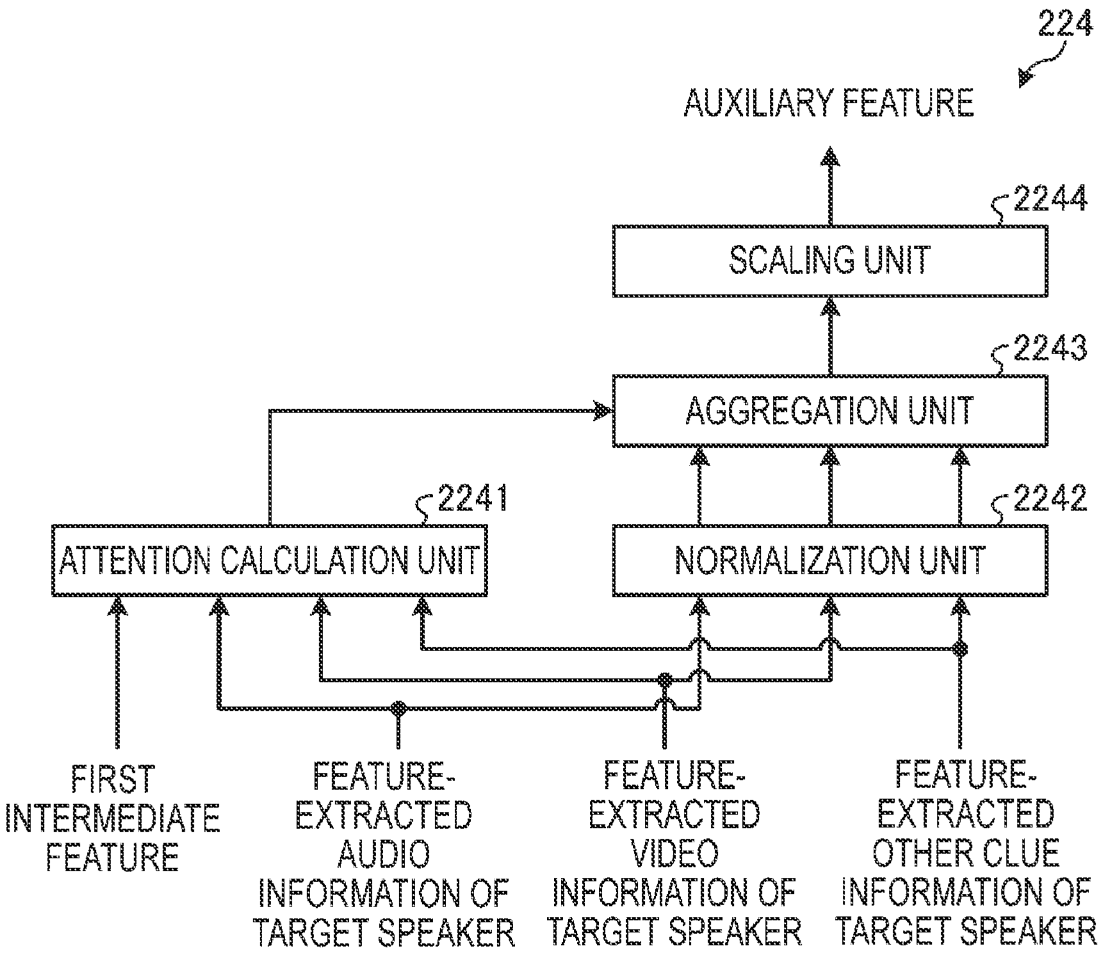
FIG. 7 is a diagram illustrating an example of a configuration of an auxiliary information generation unit illustrated in FIG. 5.

The auxiliary information generation unit 224 generates a weighted sum of the first auxiliary feature, the second auxiliary feature, and the third auxiliary feature, multiplied by corresponding attentions, using a neural network while referring to the first intermediate feature, and outputs the weighted sum to the integration unit 2212 as an auxiliary feature. FIG. 7 is a diagram illustrating an example of a configuration of the auxiliary information generation unit 224 illustrated in FIG. 5. As illustrated in FIG. 7, the auxiliary information generation unit 224 includes an attention calculation unit 2241, a normalization unit 2242, an aggregation unit 2243, and a scaling unit 2244.

The attention calculation unit 2241 has a function of calculating the values of attentions, by which the auxiliary features are to be multiplied, in the attention mechanism (see Reference 3), and predicts the values of attentions using a neural network. The attention calculation unit 2241 calculates the attentions for a sample at each time. That is, the attention calculation unit 2241 outputs values such as indicating that the audio signal of the target speaker of the input speaker, video information of speakers at the time of recording the mixed audio signal, and other clue information for the target speaker are used at rates of 0.8, 0.1, and 0.1, respectively, for each time. Reference 3: A. Vaswani, N. Shazeer, N. Parmar, J. Uszkoreit, L. Jones, A. N. Gomez, L. Kaiser and I. Polosukhin, "Attention Is All You Need," In Advances in neural information processing systems, pp. 5998-6008, 2017.

The normalization unit 2242 normalizes the norms of the first auxiliary feature (the feature-extracted audio information of the target speaker), the second auxiliary feature (the feature-extracted video information of the target speaker), and the third auxiliary feature (the feature-extracted other clue information for the target speaker). The normalization unit 2242 normalizes a sample at each time and applies a generally used method such as dividing each component of the vector by the magnitude of the vector as an operation.

The aggregation unit 2243 calculates a weighted sum of the plurality of normalized auxiliary features, multiplied by attentions corresponding to the auxiliary features calculated by the attention calculation unit 2241 (assuming that $\Psi$ ($\Psi \in \{A, V, H\}$) in equation (1), for details of which see Reference 3). The aggregation unit 2243 calculates the weighted sum for each time frame.

The scaling unit 2244 outputs the weighted sum multiplied by a scale factor calculated based on the magnitudes of the norms that have not been normalized to the audio signal processing unit 221 as an auxiliary feature. Multiplying the weighted sum by the scale factor solves the problem that normalizing the auxiliary features limits the norm of a vector that can be output by the aggregation unit 2243. For example, when the norm of each auxiliary feature is halved by the normalization unit 2242, the scaling unit 2244 performs an operation such as multiplying by 2 as a scale factor. A method such as setting a scale factor 1 as shown in equation (7) can be considered as a specific method of calculating the scale factor.

[Math. 7]

$$\frac{1}{l} = \sum_{\psi} \frac{1}{|z_{\psi}|} \tag{7}$$

In equation (7), $z_\Psi$ is an auxiliary feature of modality $\Psi$ (where $\Psi \in \{A, V, H\}$).

The training data selection unit 225 selects, from training data, a set of a mixed audio signal for training, an audio signal of a target speaker, video information of speakers at the time of recording the mixed audio signal for training, and other clue information for the target speaker.

The update unit 226 performs parameter training of each neural network. The update unit 26 causes the main neural network of the audio signal processing unit 221, the auxiliary neural networks of the feature conversion unit 230, and the neural network of the auxiliary information generation unit 224 to perform training.

Specifically, the update unit 226 updates parameters of each neural network and causes the training data selection unit 225, the feature conversion unit 230, the auxiliary information generation unit 224, and the audio signal processing unit 221 to repeatedly execute processing until a predetermined criterion is satisfied to set parameters of each neural network satisfying the predetermined criterion. The values of parameters of each neural network set in this way are applied as parameters of each neural network in an audio signal processing apparatus 510 which will be described later. The update unit 226 updates the parameters using a well-known method of updating parameters such as an error back propagation method.

The predetermined criterion is that a predetermined number of repetitions is reached. The predetermined criterion may also be that an update amount by which the parameters are updated is less than a predetermined value. Alternatively, the predetermined criterion may be that the value of a loss calculated from the difference between an audio signal extracted by the audio signal processing unit 221 and true audio of the target speaker which is a teacher signal is less than a predetermined value. For example, a commonly used, known criterion such as a scale invariant signal to distortion ratio can be used for the loss.

Training Processing

Figure 8:
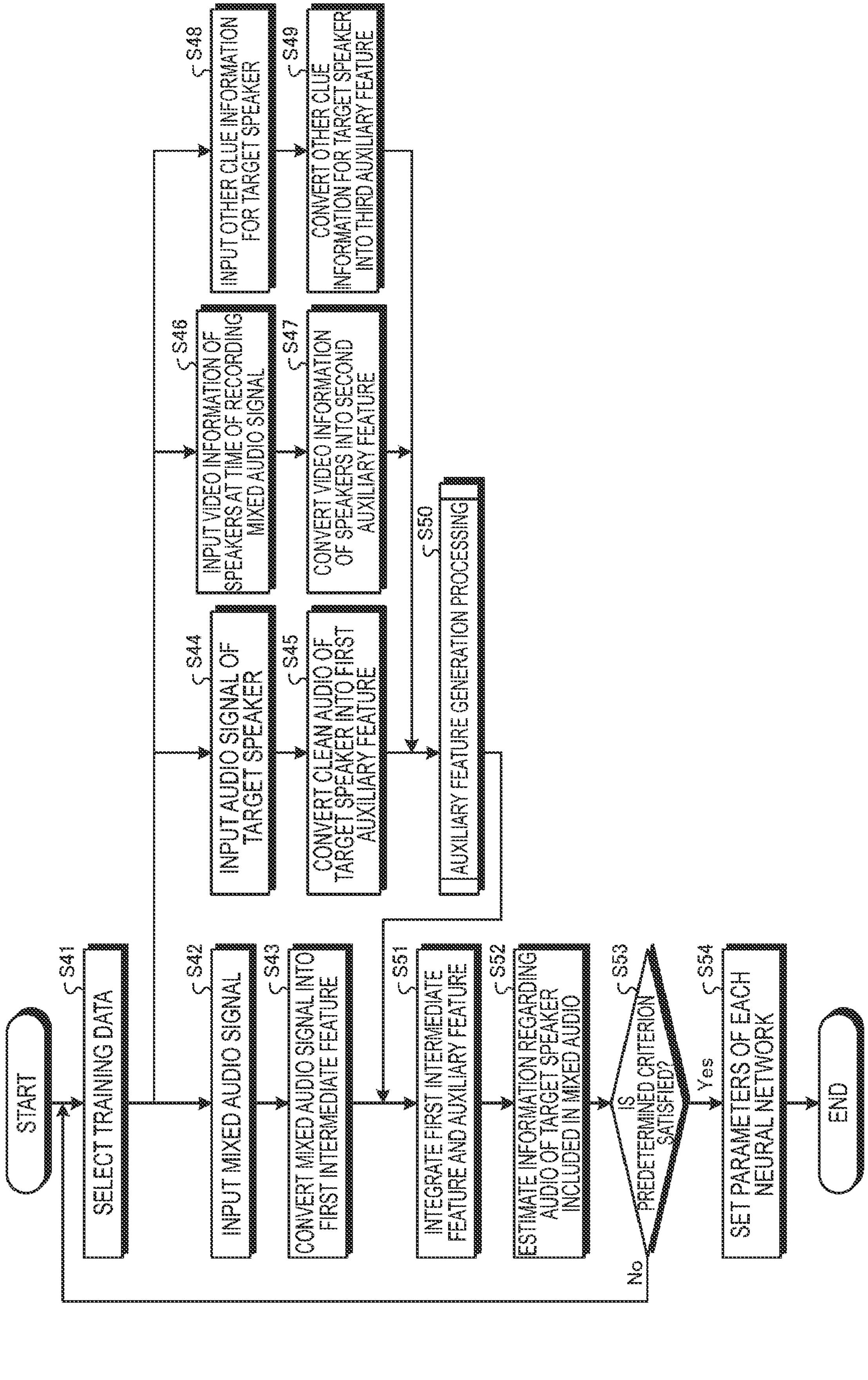
FIG. 8 is a flowchart illustrating a processing procedure for training processing according to the second embodiment.

Next, training processing according to the second embodiment will be described. FIG. 8 is a flowchart showing a processing procedure for the training processing according to the second embodiment.

As illustrated in FIG. 8, the training data selection unit 225 selects, from training data, a set of a mixed audio signal for training, an audio signal of a target speaker, video information of speakers at the time of recording the mixed audio signal for training, and other clue information for the target speaker (step S41). The training data selection unit 225 inputs the mixed audio signal for training, the audio signal of the target speaker, the video information of speakers at the time of recording the mixed audio signal for training, and the other clue information for the target speaker, which have been selected, to the first conversion unit 211, the first auxiliary feature conversion unit 222, the second auxiliary feature conversion unit 223, and the third auxiliary feature conversion unit 227, respectively (steps S42, S44, S46, and S48).

Steps S43, S45, and S47 are the same processing operations as steps S23, S25, and S27 shown in FIG. 4. The third auxiliary feature conversion unit 227 converts the input other clue information for the target speaker into a third auxiliary feature using the third auxiliary neural network (step S49). The auxiliary information generation unit 224 generates an auxiliary feature based on the first auxiliary feature, the second auxiliary feature, and the third auxiliary feature (step S50).

The integration unit 2212 integrates the first intermediate feature obtained through conversion by the first conversion unit 211 and the auxiliary feature generated by the auxiliary information generation unit 224 to generate a second intermediate feature (step S51). Steps S52 to S54 shown in FIG. 8 are the same processing operations as steps S30 to S32 shown in FIG. 4.

Auxiliary Feature Generation Processing

Figure 9:
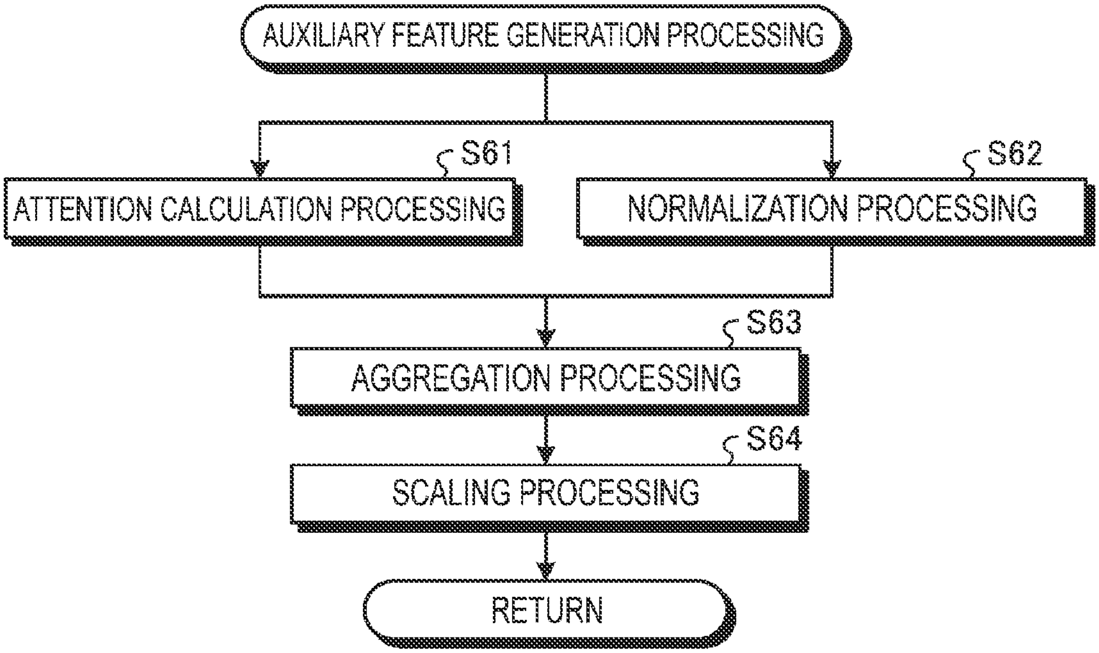
FIG. 9 is a flowchart illustrating a processing procedure for auxiliary feature generation processing illustrated in FIG. 8.

Next, the auxiliary feature generation processing (step S50) shown in FIG. 8 will be described. FIG. 9 is a flowchart showing a processing procedure for the auxiliary feature generation processing illustrated in FIG. 8.

As illustrated in FIG. 9, the attention calculation unit 2241 calculates the values of attentions by which the auxiliary features are to be multiplied (step S61). In parallel with step S61, the normalization unit 2242 normalizes the norms of the first auxiliary feature, the second auxiliary feature, and the third auxiliary feature (step S62).

The aggregation unit 2243 performs aggregation processing for calculating a weighted sum of the plurality of normalized auxiliary features, multiplied by attentions corresponding to the auxiliary features calculated by the attention calculation unit 2241 (step S63). Then, the scaling unit 2244 performs scaling processing for calculating the weighted sum multiplied by a scale factor calculated based on the magnitudes of the norms that have not been normalized (step S64) and outputs the weighted sum multiplied by the scale factor to the audio signal processing unit 221 as an auxiliary feature.

Advantages of Second Embodiment

The training apparatus 220 can reduce the deviation of the norms of the vectors of auxiliary features between modalities by calculating the weighted sum after normalizing the norms of the auxiliary features as described above.

Thus, the second embodiment solves the problem of norm imbalance, such that it is easy to learn attentions normally, the target speaker extraction performance is improved, and the values of attentions can be given interpretability. That is, in the second embodiment, the problem of norm imbalance between modalities is solved and the attention mechanism is trained more effectively, thereby improving the performance of extracting an audio signal of a target speaker.

In addition, values indicated by the attention mechanism can be interpretable. In other words, in the second embodiment, it can be determined which clues are emphasized or that all clues are functioning effectively by viewing the values of attentions. For example, interpretation of the state of each clue based on the value of attention is possible such as interpretation that there may be some problem with a video clue if a value emphasizing an audio clue is output.

Third Embodiment

In a third embodiment, multitask training (attention guided training) that can more effectively perform attention training will be described.

Training Apparatus

Figure 10:
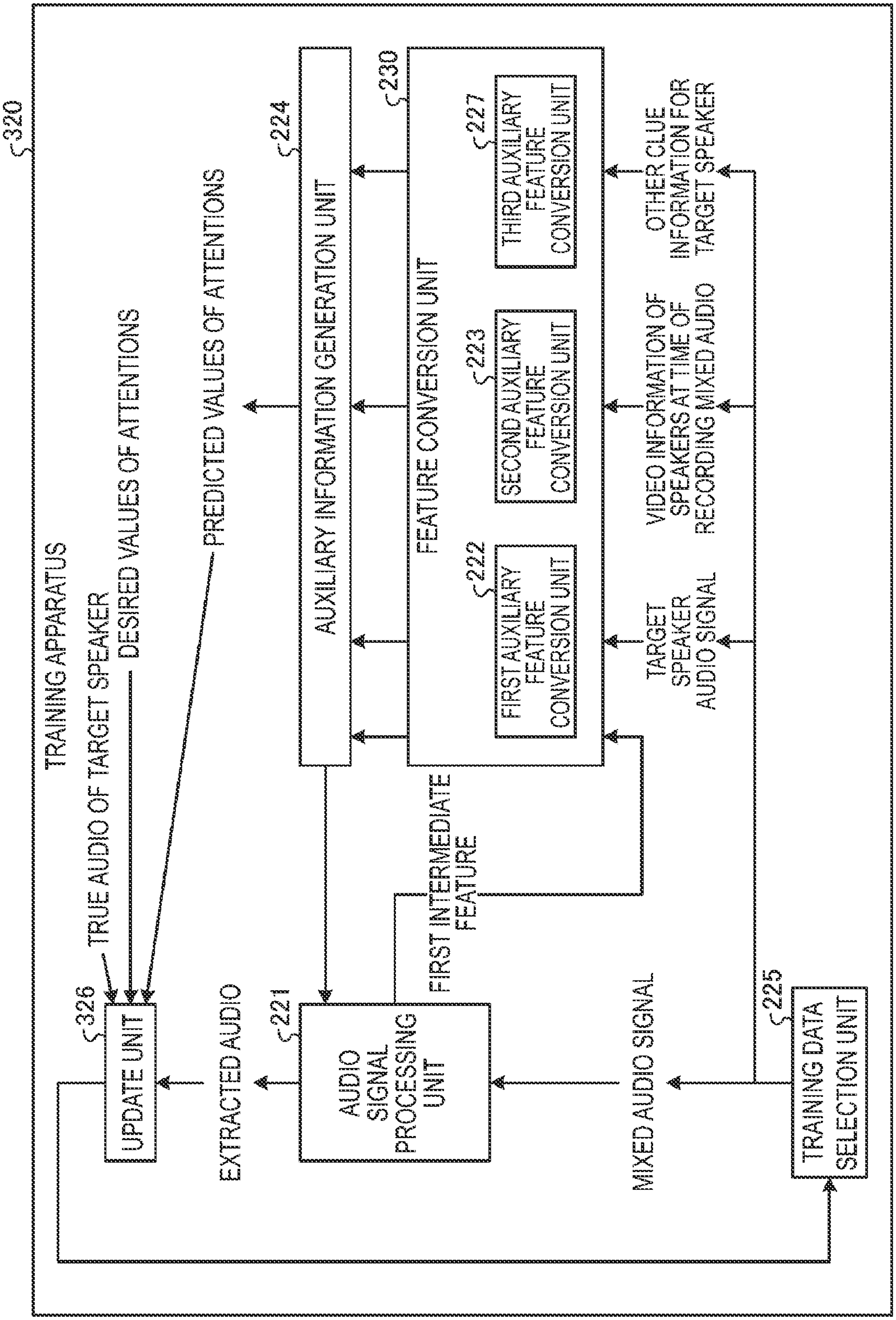
FIG. 10 is a diagram illustrating an example of a configuration of a training apparatus according to a third embodiment.

FIG. 10 is a diagram illustrating an example of a configuration of a training apparatus according to the third embodiment. The training apparatus 320 according to the third embodiment is realized, for example, by a computer or the like, which includes a ROM, a RAM, a CPU, and the like, reading a predetermined program and the CPU executing the predetermined program. As illustrated in FIG. 10, the training apparatus 320 includes an update unit 326 instead of the update unit 226 as compared with the training apparatus 220 according to the second embodiment. The auxiliary information generation unit 224 outputs the values of attentions corresponding to auxiliary features calculated by the attention calculation unit 2241 to the update unit 326. The auxiliary information generation unit 224 may have a configuration in which the normalization unit 2242 and the scaling unit 2244 are omitted (normalized attention is not applied).

The update unit 326 updates parameters of each neural network and causes the training data selection unit 225, the feature conversion unit 230, the auxiliary information generation unit 224, and the audio signal processing unit 221 to repeatedly execute processing until a predetermined criterion is satisfied to set parameters of each neural network satisfying the predetermined criterion. The update unit 326 updates parameters of each neural network so as to optimize an objective function based on attentions corresponding to the auxiliary features calculated by the attention calculation unit 2241, preset desired values of attentions corresponding to the auxiliary features, the audio signal of the target speaker included in the mixed audio signal for training, estimated by the audio signal processing unit 221, and a teacher signal of audio of the target speaker included in the mixed audio signal for training. The objective function is, for example, a loss function as in equation (8) which will be described later.

The update unit 326 receives as inputs the values of attentions $\hat{\alpha}^\Psi$ corresponding to the auxiliary features calculated by the attention calculation unit 2241 in the auxiliary information generation unit 224, preset desired values of attentions $\alpha^\Psi$ corresponding to the auxiliary features, an audio signal $\hat{x}$ of the target speaker included in the mixed audio signal for training, estimated by the audio signal processing unit 221, and a teacher signal x of audio of the target speaker (true audio of the target speaker) included in the mixed audio signal for training. Then, the update unit 326 calculates a loss based on this information and updates parameters of each neural network by causing each neural network to perform multitask training such that the calculated loss becomes less than a predetermined value.

The following method can be considered for the desired values of attentions. For example, when a plurality of signals relating to processing of an audio signal of a target speaker are all available as clue information for the target speaker, for first information regarding processing of the audio signal of the target speaker (for example, an audio signal of the target speaker of the input speaker) and second information regarding processing of the audio signal of the target speaker (for example, video information of speakers at the time of recording a mixed audio signal), the first information and the second information are set to [0.5, 0.5], and when the first information is not available, the first information and the second information are set to [0.0, 1.0].

A known technique such as backpropagation, which is generally used for training neural networks, can be used for training. In the third embodiment, for example, a loss function L is designed as in equation (8) using the values of attentions $\hat{\alpha}^\Psi$ corresponding to the auxiliary features calculated by the attention calculation unit 2241 in the auxiliary information generation unit 224, preset desired values of attentions $\alpha^\Psi$ corresponding to the auxiliary features, an audio signal $\hat{x}$ of the target speaker included in the mixed audio signal for training, estimated by the audio signal processing unit 221, and a teacher signal x of audio of the target speaker included in the mixed audio signal for training.

[Math. 8]

$$\mathcal{L}=d_1(x,\hat{x})+\alpha\Sigma_\Psi d_2(\hat{a}^\Psi, a^\Psi) \tag{8}$$

Here, $d_1$ and $d_2$ are distance measures, and for example, a scale invariant signal to distortion ratio can be used as $d_1$, and for example, an average of mean square errors, one calculated at each time, can be used as $d_2$.

Advantages of Third Embodiment

In the third embodiment, the attention mechanism is trained more effectively and the performance of extracting an audio signal of a target speaker is improved because multitask training is performed by further using the values of attentions $\hat{\alpha}^\Psi$ corresponding to the auxiliary features calculated by the attention calculation unit 2241 in the auxiliary information generation unit 224 and the preset desired values of attentions $\alpha^\Psi$ corresponding to the auxiliary features as described above.

Fourth Embodiment

In a fourth embodiment, multitask training (clue condition aware training) whereby attention training can be more effectively performed will be described.

Training Apparatus

Figure 11:
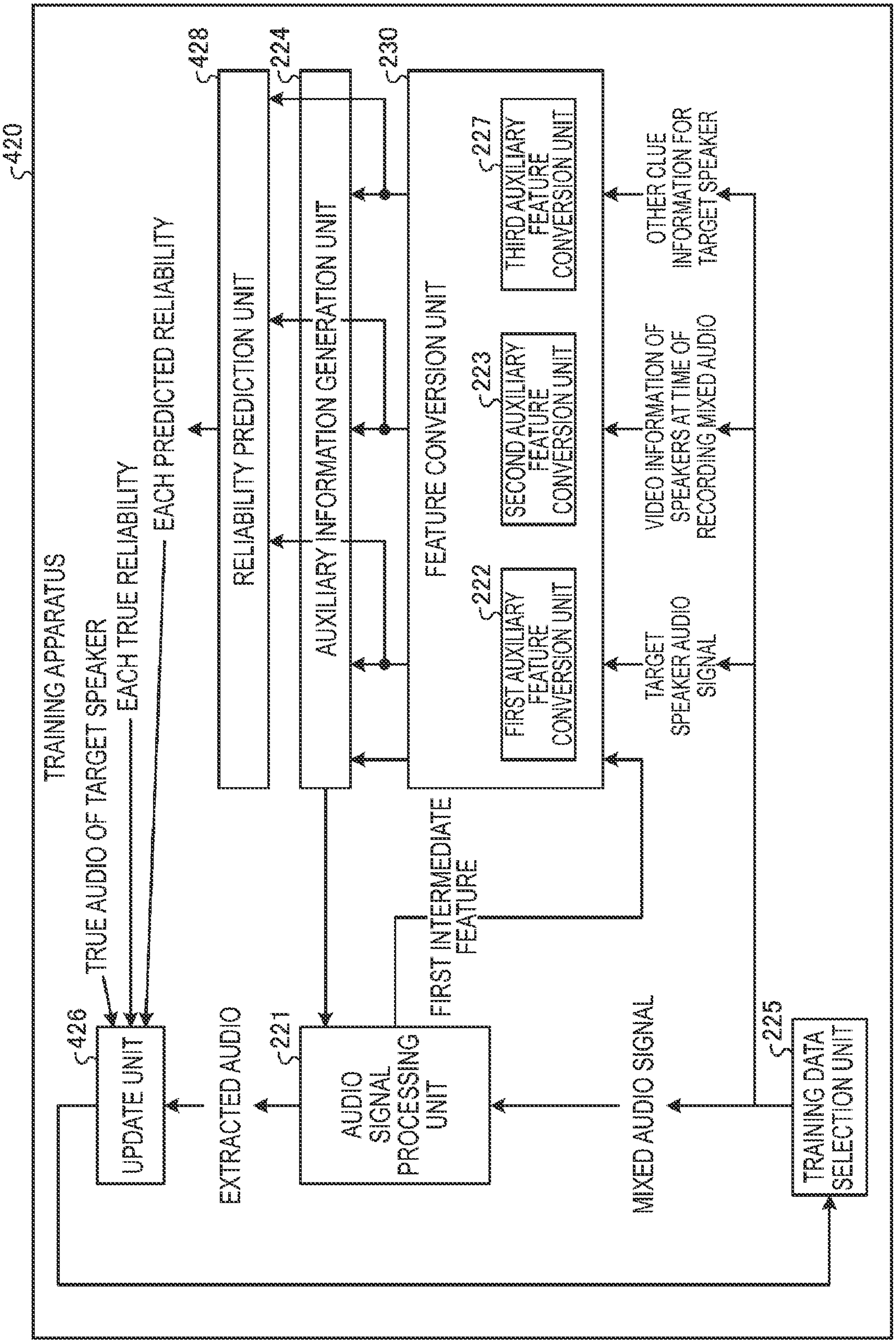
FIG. 11 is a diagram illustrating an example of a configuration of a training apparatus according to a fourth embodiment.

FIG. 11 is a diagram illustrating an example of a configuration of a training apparatus according to the fourth embodiment. The training apparatus 420 according to the fourth embodiment is realized, for example, by a computer or the like, which includes a ROM, a RAM, a CPU, and the like, reading a predetermined program and the CPU executing the predetermined program. As illustrated in FIG. 11, the training apparatus 320 includes an update unit 426 instead of the update unit 226 as compared with the training apparatus 220 according to the second embodiment. The training apparatus 320 further includes a reliability prediction unit 428 (reliability) as compared with the training apparatus 220. The feature conversion unit 230 outputs auxiliary features to the reliability prediction unit 428. The auxiliary information generation unit 224 may have a configuration in which the normalization unit 2242 and the scaling unit 2244 are omitted.

The reliability prediction unit 428 predicts the reliabilities $\hat{r}^\Psi$ of a plurality of signals relating to processing of the audio signal of the target speaker for training at each time based on the auxiliary features obtained through conversion by the feature conversion unit 230. The reliability prediction unit 428 uses, for example, a neural network such as a convolution neural network (CNN), a long short-term memory (LSTM), or a recurrent neural network (RNN) as a model for predicting reliabilities.

The update unit 426 updates parameters of each neural network and causes the training data selection unit 225, the feature conversion unit 230, the auxiliary information generation unit 224, the reliability prediction unit 428, and the audio signal processing unit 221 to repeatedly execute processing until a predetermined criterion is satisfied to set parameters of each neural network satisfying the predetermined criterion. The update unit 426 updates parameters of each neural network so as to optimize an objective function based on the reliabilities of the plurality of signals relating to processing of the audio signal of the target speaker for training predicted by the reliability prediction unit 428, predetermined reliabilities of the plurality of signals relating to processing of the audio signal of the target speaker for training, the audio signal of the target speaker included in the mixed audio signal for training, estimated by the audio signal processing unit 221, and a teacher signal of audio of the target speaker included in the mixed audio signal for training. The objective function is, for example, a loss function as in equation (9) which will be described later.

The update unit 426 receives as inputs the reliabilities $\hat{r}^{\Psi}$ of the plurality of signals relating to processing of the audio signal of the target speaker for training predicted by the reliability prediction unit 428, predetermined reliabilities $r^{\Psi}$ (true reliabilities) of the plurality of signals relating to processing of the audio signal of the target speaker for training, an audio signal $\hat{x}$ of the target speaker included in the mixed audio signal for training, estimated by the audio signal processing unit 221, and a teacher signal x of audio of the target speaker (true audio of the target speaker) included in the mixed audio signal for training. Then, the update unit 426 calculates a loss based on this information and updates parameters of each neural network by causing each neural network to perform multitask training such that the calculated loss becomes less than a predetermined value.

For example, for the reliability of video information of speakers at the time of recording a mixed audio signal, the proportion of the area not shielded by a hand or the like in the area around the mouth can be used as the reliabilities of the plurality of signals relating to processing of the audio signal of the target speaker for training. That is, the reliability is 1 if the area around the mouth is not shielded and 0 if the entire area is shielded.

For training, a known technique such as backpropagation which is generally used for training neural networks can be used. In the fourth embodiment, for example, a loss function L is designed as in equation (9) using the reliabilities $\hat{r}^{\Psi}$ of the plurality of signals relating to processing of the audio signal of the target speaker for training predicted by the reliability prediction unit 428, predetermined reliabilities $r^{\Psi}$ of the plurality of signals relating to processing of the audio signal of the target speaker for training, an audio signal $\hat{x}$ of the target speaker included in the mixed audio signal for training, estimated by the audio signal processing unit 221, and a teacher signal x of audio of the target speaker included in the mixed audio signal for training.

[Math. 9]

$$\mathcal{L}=d_1(x,\hat{x})+\beta\Sigma_{\psi}d_3(\hat{r}^{\psi}, r^{\psi}) \tag{9}$$

Here, $d_1$ and $d_3$ are distance measures, and for example, a scale invariant signal to distortion ratio can be used as $d_1$, and for example, an average of mean square errors, one calculated at each time, can be used as $d_3$.

Training Processing

Figure 12:
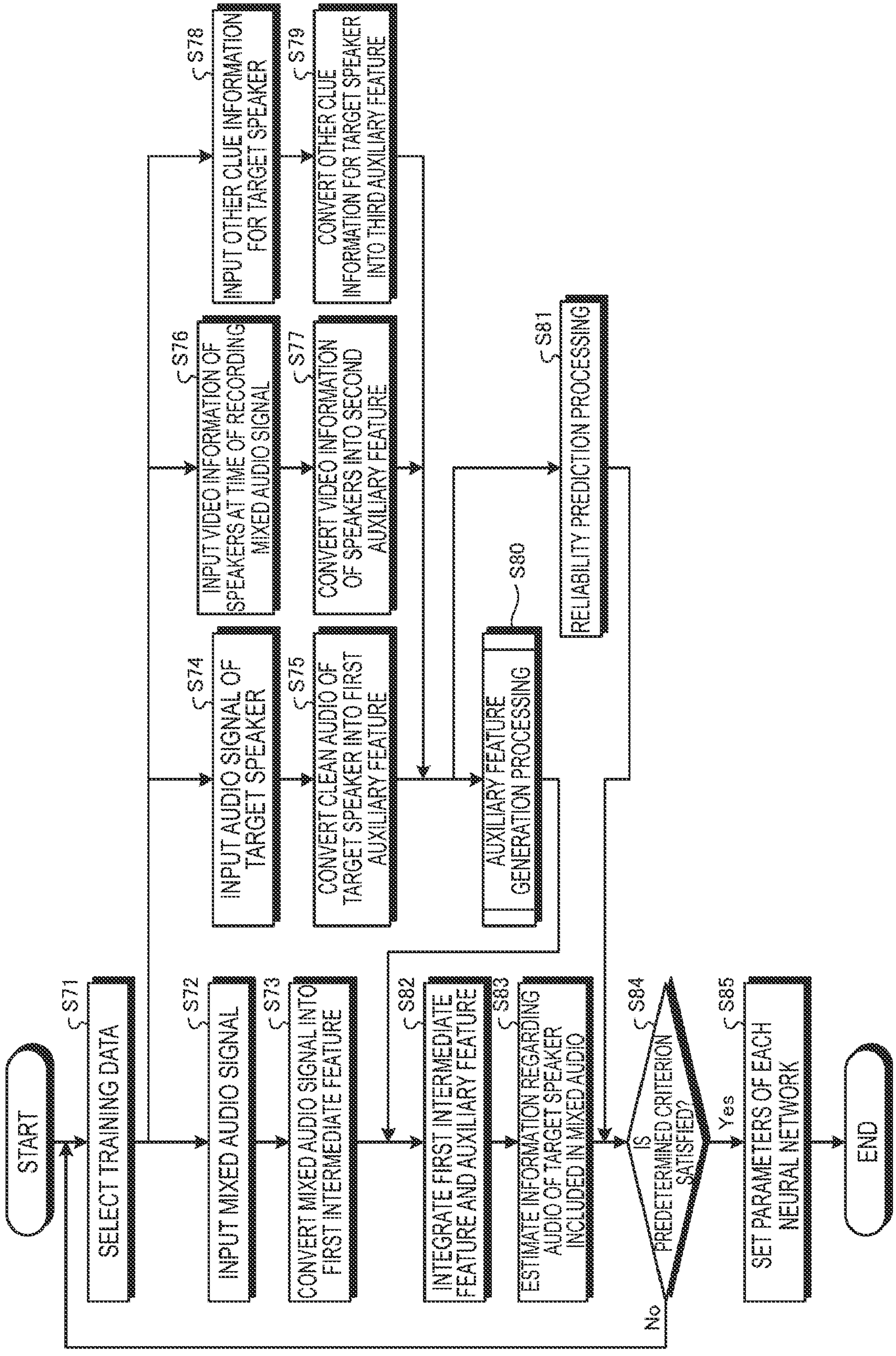
FIG. 12 is a flowchart illustrating a processing procedure for training processing according to the fourth embodiment.

Next, training processing according to the fourth embodiment will be described. FIG. 12 is a flowchart showing a processing procedure for the training processing according to the fourth embodiment.

Steps S71 to S80 shown in FIG. 12 are the same processing operations as steps S41 to S50 shown in FIG. 8. The reliability prediction unit 428 performs processing of predicting the reliabilities of a plurality of signals relating to processing of the audio signal of the target speaker for training at each time based on the auxiliary features obtained through conversion by the feature conversion unit 230 (step S81). Steps S82 and S83 are the same processing operations as steps S51 and S52 shown in FIG. 8. Step S84 is the same processing as step S53, where the update unit 426 uses the value of the loss function L shown in equation (9) when using the value of the loss function as a predetermined criterion. Step S85 is the same processing as step S54 shown in FIG. 8.

Advantages of Fourth Embodiment

In the fourth embodiment, the attention mechanism is trained more effectively and the performance of extracting an audio signal of a target speaker is improved because multitask training is performed by further using the reliabilities of the plurality of signals relating to processing of the audio signal of the target speaker for training at each time predicted by the reliability prediction unit 428 and the predetermined reliabilities of the plurality of signals relating to processing of the audio signal of the target speaker for training described above.

Fifth Embodiment

Figure 13:
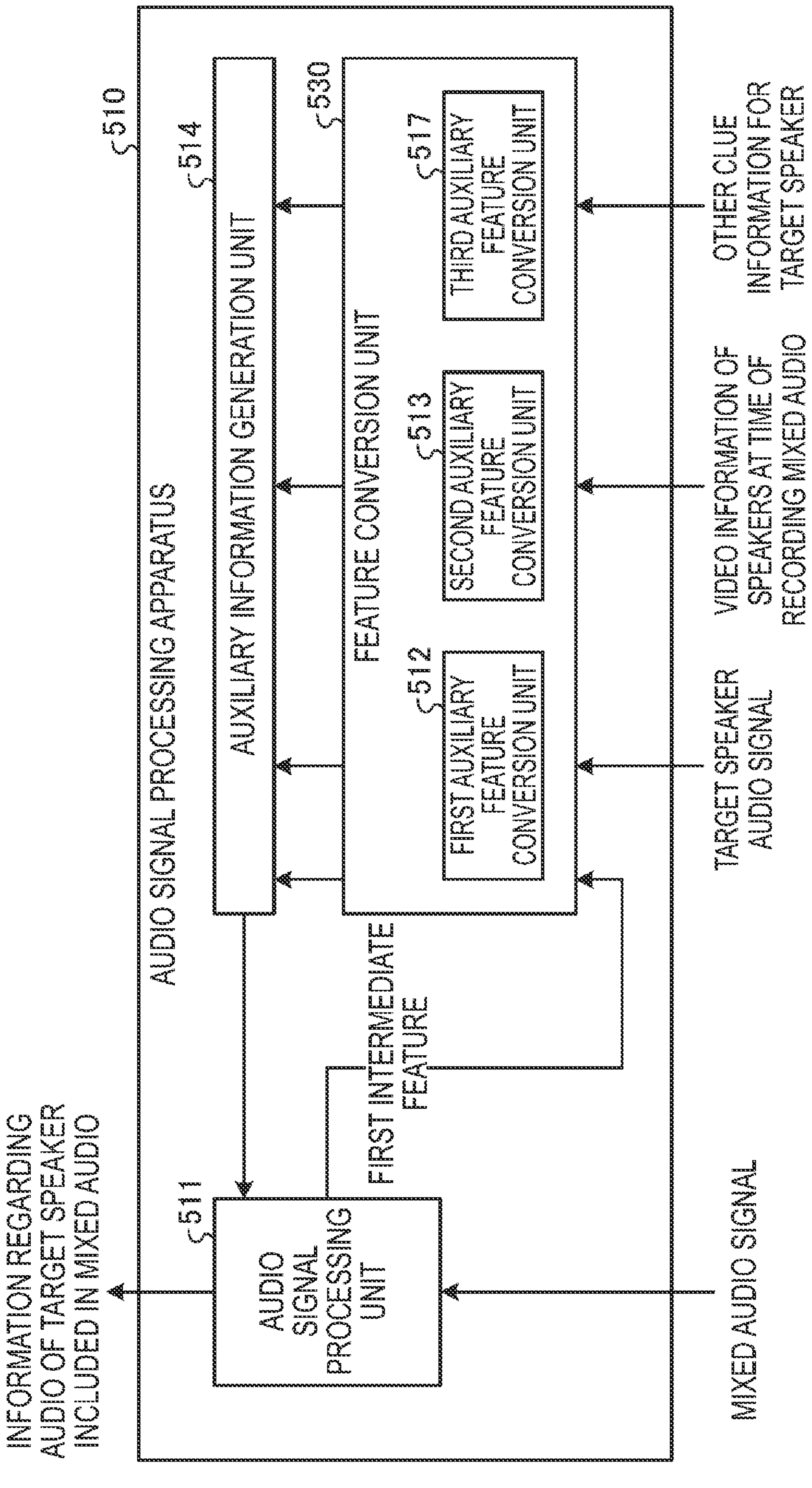
FIG. 13 is a diagram illustrating an example of a configuration of an audio signal processing apparatus according to a fifth embodiment.

Next, an audio signal processing apparatus according to a fifth embodiment will be described. FIG. 13 is a diagram illustrating an example of a configuration of the audio signal processing apparatus according to the fifth embodiment. The audio signal processing apparatus 510 according to the fifth embodiment is realized, for example, by a computer or the like, which includes a ROM, a RAM, a CPU, and the like, reading a predetermined program and the CPU executing the predetermined program. The audio signal processing apparatus 510 includes an audio signal processing unit 511, a feature conversion unit 530, and an auxiliary information generation unit 514 (a generation unit).

The audio signal processing unit 511 has the same function as the audio signal processing unit 221 illustrated in FIG. 5. The auxiliary information generation unit 514 has the same function as the auxiliary information generation unit 224 illustrated in FIG. 5. The auxiliary information generation unit 514 may have the same configuration as the auxiliary information generation unit 224 illustrated in FIG. 7 (in which normalized attention is applied) and may also have a configuration of the auxiliary information generation unit 224 illustrated in FIG. 7 in which the normalization unit 2242 and the scaling unit 2244 are omitted (in which normalized attention is not applied). The feature conversion unit 530 includes a first auxiliary feature conversion unit 512 having the same function as the first auxiliary feature conversion unit 222 illustrated in FIG. 5, a second auxiliary feature conversion unit 513 having the same function as the second auxiliary feature conversion unit 223 illustrated in FIG. 1, and a third auxiliary feature conversion unit 517 that converts other clue information for the target speaker that has been input into a third auxiliary feature using a third auxiliary neural network. Parameters of neural networks included in the audio signal processing unit 511, the feature conversion unit 530, and the auxiliary information generation unit 514 are set by the training apparatus 220, the training apparatus 320, or the training apparatus 420.

Evaluation Experiment

A simulation data set of mixed audio signals based on a lip reading sentences 3 (LRS3)-TED audio-video corpus was generated for evaluation. The data set includes mixed audio signals of two speakers generated by mixed utterances at a signal to noise ratio (SNR) of 0 to 5 dB. Table 3 shows the results of comparing the accuracy of the audio signal processing according to the first embodiment and the accuracy of the audio signal processing according to the fifth embodiment.

TABLE 3

The extraction performance. Five rows from the bottom are proposed method and any of them outperformed the existing attention fusion model and the summation fusion model. The normalized attention with "sisnr + reliability loss" performed the best.

| | | | | | condition of visual clues (mask size) | | | | |
|---|---|---|---|---|---|---|---|---|---|
| | | | | | clean | | | medium | full |
| | | training | multitask | normalized | condicition of audio clues (SNR) | | | | |
| No | fusion | data | training | attenntion | −20 dB | 0 dB | clean | | |
| | | mixture | | | | | 0.09 | | |
| 1 | sum | augment | | | 15.33 | 15.39 | 15.37 | 14.41 | 14.41 |
| 2 | attention | augment | | | 15.26 | 15.40 | 14.78 | 14.53 | 14.53 |
| 3 | attention | augment | | √ | 15.84 | 15.91 | 15.89 | 15.41 | 14.94 |
| 4 | attention | augment | att.guided | | 15.86 | 15.92 | 15.91 | 15.31 | 14.79 |
| 5 | attention | augment | cluc cond.aware | | 15.91 | 15.93 | 15.93 | 15.37 | 14.94 |
| 6 | attention | augment | att.guided | √ | 15.85 | 15.92 | 15.91 | 15.35 | 14.85 |
| 7 | attention | augment | att.guided | √ | 15.97 | 16.05 | 16.06 | 15.53 | 15.01 |

In Table 3, "No. 1" corresponds to the case where a plurality of auxiliary features are summed without weighting. "No. 2" corresponds to the case of the audio signal processing apparatus 10 according to the first embodiment where a weighted sum of a plurality of auxiliary features, multiplied by attentions corresponding to the auxiliary features, is applied as an auxiliary feature. "No. 3" to "No. 7" correspond to the audio signal processing apparatus 510 according to the fifth embodiment.

Of these, "No. 3" corresponds to the case where parameters of each neural network are set by the training apparatus 220 (with normalized attention), "No. 4" corresponds to the case where parameters of each neural network are set by the training apparatus 320 (with attention guided training, but normalized attention not applied), "No. 5" corresponds to the case where parameters of each neural network are set by the training apparatus 420 (with clue condition aware training, but normalized attention not applied), "No. 6" corresponds to the case where parameters of each neural network are set by the training apparatus 320 (with attention guided training and normalized attention applied), and "No. 7" corresponds to the case where parameters of each neural network are set by the training apparatus 420 (with clue condition aware training, but normalized attention applied).

"No. 3" to "No. 7" showed better results than "No. 2" when parameters of each neural network were set by any of the training apparatuses 220, 320, and 420. Then, as shown in "No. 6" and "No. 7," it was found that further applying normalized attention (norm normalization) can increase the accuracy when multitask training of attention guided training and clue condition aware training is applied. In this way, the audio signal processing apparatus 510 according to the fifth embodiment can further increase the accuracy of audio signal processing as compared with the first embodiment.

The word "modal" indicates the type of input information (such as image, audio, text, sensor data, or statistical information) to the system (apparatus), and "multi-modal" indicates that various types of input information are used. Pieces of information obtained from each means such as a camera and a microphone when information is acquired are called modalities.

System Configuration and the Like

The components of the apparatuses shown are functionally conceptual and are not necessarily physically configured as shown. That is, the specific modes of dispersion and integration of the apparatuses are not limited to those shown and all or some of the apparatuses can be configured such that they are functionally or physically dispersed or integrated in any units according to various loads, use conditions, or the like. For example, the audio signal processing apparatus 10 or 510 and the training apparatus 20, 220, 320, or 420 may be an integrated apparatus. Further, all or any part of the processing functions performed in the apparatuses may be realized by a CPU and a program to be interpreted/performed by the CPU or may be realized as hardware by a wired logic.

All or some of processing operations described as being performed automatically among the processing operations described in the embodiments may be performed manually or all or some of processing operations described as being performed manually may be performed automatically according to a known method. The processing operations described in the present embodiment may be performed not only in chronological order according to the order of description, but also in parallel or individually as necessary or according to the processing capability of the apparatus that performs the processing operations. Further, the processing procedures, the control procedures, the specific names, and information including various data and parameters described in the specification or shown in the drawings may be arbitrarily changed except for specified cases.

Program

Figure 14:
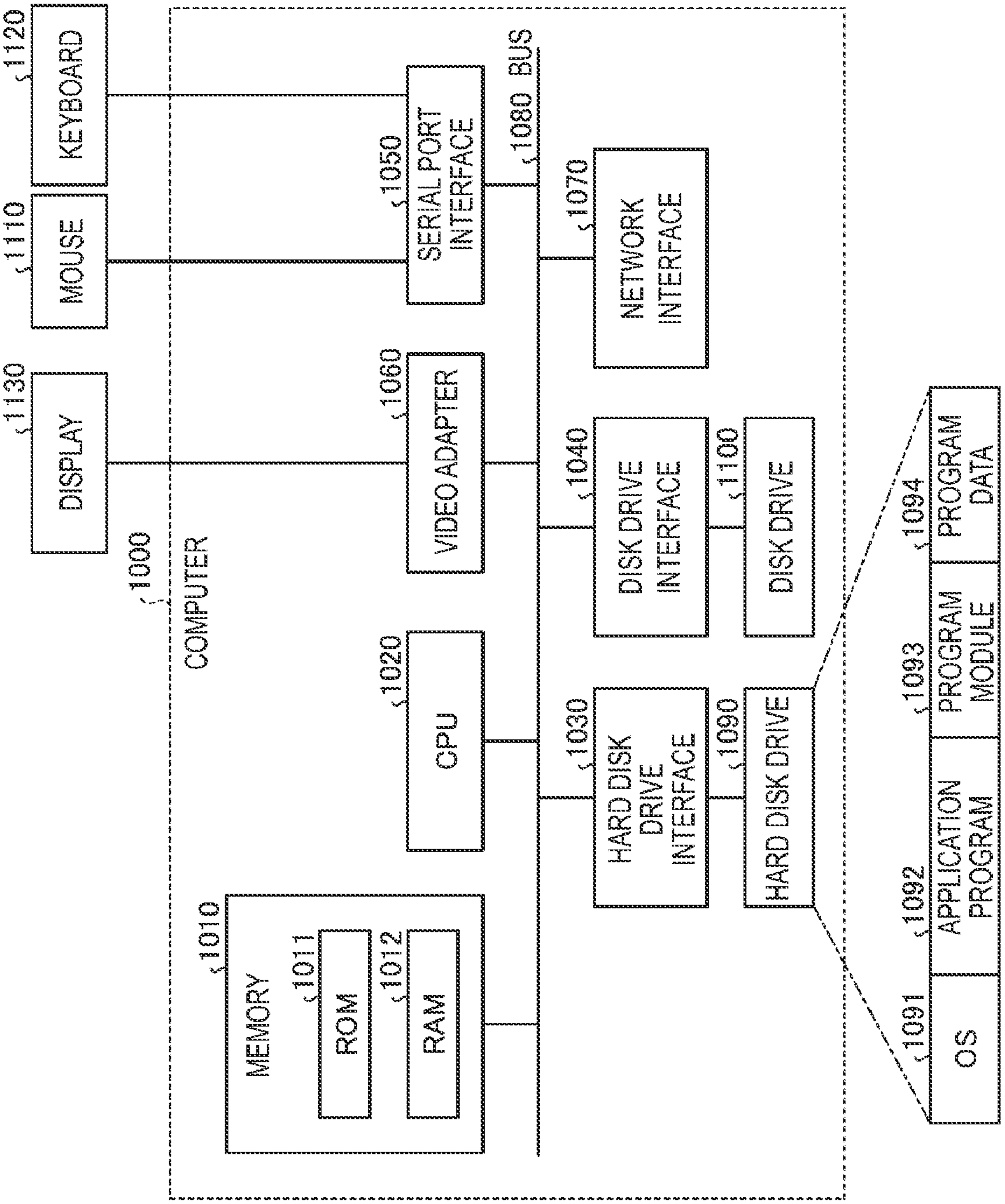
FIG. 14 is a diagram illustrating an example of a computer that realizes an audio signal processing apparatus or a training apparatus by executing a program.

FIG. 14 is a diagram illustrating an example of a computer that realizes the audio signal processing apparatus 10 or 510 and the training apparatus 20, 220, 320, or 420 by executing a program. The computer 1000 has, for example, a memory 1010 and a CPU 1020. The computer 1000 has a hard disk drive interface 1030, a disk drive interface 1040, a serial port interface 1050, a video adapter 1060, and a network interface 1070. These components are connected by a bus 1080.

The memory 1010 includes a ROM 1011 and a RAM 1012. The ROM 1011 stores, for example, a boot program such as a basic input output system (BIOS). The hard disk drive interface 1030 is connected to a hard disk drive 1031. The disk drive interface 1040 is connected to a disk drive 1041. For example, a removable storage medium such as a magnetic disk or an optical disc is inserted into the disk drive 1041. The serial port interface 1050 is connected, for example, to a mouse 1110 and a keyboard 1120. The video adapter 1060 is connected, for example, to a display 1130.

The hard disk drive 1031 stores, for example, an OS 1091, an application program 1092, a program module 1093, and program data 1094. That is, a program that defines each processing of the audio signal processing apparatus 10 or 510 and the training apparatus 20, 220, 320, or 420 is implemented as the program module 1093 in which codes executable by the computer 1000 are described. The program module 1093 is stored, for example, in the hard disk drive 1031. For example, a program module 1093 for executing the same processing as the functional configuration of each of the audio signal processing apparatus 10 or 510 and the training apparatus 20, 220, 320, or 420 is stored in the hard disk drive 1031. The hard disk drive 1031 may be replaced by a solid state drive (SSD).

Setting data used in the processing of the embodiments described above is stored as the program data 1094, for example, in the memory 1010 or the hard disk drive 1031. The CPU 1020 reads the program module 1093 and the program data 1094 stored in the memory 1010 and the hard disk drive 1031 into the RAM 1012 as needed and executes them.

The program module 1093 and the program data 1094 are not limited to being stored in the hard disk drive 1031. For example, the program module 1093 and the program data 1094 may be stored in a removable storage medium and read by the CPU 1020 via the disk drive 1041 or the like. Alternatively, the program module 1093 and the program data 1094 may be stored in another computer connected via a network (such as a local area network (LAN) or a wide area network (WAN)). Then, the program module 1093 and the program data 1094 may be read from the other computer by the CPU 1020 via the network interface 1070. The processing of neural networks used in the audio signal processing apparatus 10 or 510 and the training apparatus 20, 220, 320, or 420 may be executed using a GPU.

Although embodiments to which the invention made by the inventor is applied have been described, the present invention is not limited by the description and the drawings that form a part of the disclosure of the present invention according to the present embodiments. That is, other embodiments, examples, operation techniques, and the like that those skilled in the art implement based on the present embodiments are all included in the scope of the present invention.

REFERENCE SIGNS LIST

10, 510 Audio signal processing apparatus
20, 220, 320, 420 Training apparatus
11,21, 221, 511 Audio signal processing unit
12, 22, 222, 512 First auxiliary feature conversion unit
13, 23, 223, 513 Second auxiliary feature conversion unit
14, 24, 224, 514 Auxiliary information generation unit
25, 225 Training data selection unit
26, 226, 326, 426 Update unit
111, 211 First Conversion unit
112, 212, 2212 Integrated unit
113, 213 Second conversion unit
230, 530 Feature conversion unit
227, 517 Third auxiliary feature conversion unit
428 Reliability prediction unit
2241 Attention calculation unit
2242 Normalization Unit
2243 Aggregation Unit
2244 Scaling unit

The invention claimed is:

1. A training apparatus comprising:

a selection unit configured to select a mixed audio signal for training and a plurality of signals relating to processing of an audio signal of a target speaker for training from training data;

a feature conversion unit configured to convert the plurality of signals relating to the processing of the audio signal of the target speaker for training into a plurality of auxiliary features for the plurality of signals using a plurality of auxiliary neural networks corresponding to the plurality of signals;

an audio signal processing unit configured to estimate information regarding processing of an audio signal of the target speaker included in the mixed audio signal for training using a main neural network based on a feature of the mixed audio signal for training and the plurality of auxiliary features; and an update unit configured to update parameters of neural networks and cause the selection unit, the feature conversion unit, and the audio signal processing unit to repeatedly execute processing until a predetermined criterion is satisfied to set the parameters of the neural networks satisfying the predetermined criterion, wherein the plurality of signals relating to processing of the audio signal of the target speaker are two or more pieces of information of different modalities, wherein the training apparatus further comprising:

an auxiliary information generation unit configured to generate a weighted sum of the plurality of auxiliary features multiplied by attentions corresponding to the plurality of auxiliary features using a neural network, wherein the audio signal processing unit is configured to receive as an input a second intermediate feature generated by integrating a first intermediate feature obtained by converting the mixed audio signal using a first main neural network included in the main neural network, and the weighted sum and estimate information regarding the audio signal of the target speaker included in the mixed audio signal for training using a second main neural network included in the main neural network, and the auxiliary information generation unit includes:

an attention calculation unit configured to calculate attentions corresponding to the plurality of auxiliary features based on the first intermediate feature and the plurality of auxiliary features; and an aggregation unit configured to calculate the weighted sum of the plurality of auxiliary features multiplied by the attentions corresponding to the plurality of auxiliary features calculated by the attention calculation unit.

2. The training apparatus according to claim 1, wherein the selection unit is configured to select the mixed audio signal for training, the audio signal of the target speaker for training, and video information of speakers at a time of recording the mixed audio signal for training from the training data, the feature conversion unit includes:

a first auxiliary feature conversion unit configured to convert the audio signal of the target speaker into a first auxiliary feature using a first auxiliary neural network; and a second auxiliary feature conversion unit configured to convert the video information of the speakers at the time of recording the mixed audio signal for training into a second auxiliary feature using a second auxiliary neural network, the audio signal processing unit is configured to estimate information regarding the audio signal of the target speaker included in the mixed audio signal for training using the main neural network based on the feature of the mixed audio signal for training, the first auxiliary feature, and the second auxiliary feature, and the update unit is configured to update parameters of neural networks and cause the selection unit, the first auxiliary feature conversion unit, the second auxiliary feature conversion unit, and the audio signal processing unit to repeatedly execute processing until the predetermined criterion is satisfied to set the parameters of the neural networks satisfying the predetermined criterion.

3. The training apparatus according to claim 2, wherein the update unit is configured to update parameters of neural networks to allow a weighted sum of a first loss, with respect to a teacher signal, of audio of the target speaker included in the mixed audio signal for training where the audio signal processing unit is estimated using the feature of the mixed audio signal for training, the first auxiliary feature, and the second auxiliary feature, a second loss, with respect to a teacher signal, of audio of the target speaker included in the mixed audio signal for training where the audio signal processing unit is estimated based on the feature of the mixed audio signal for training and the first auxiliary feature, and a third loss, with respect to a teacher signal, of audio of the target speaker included in the mixed audio signal for training that is estimated based on the feature of the mixed audio signal for training and the second auxiliary feature to become smaller.

4. The training apparatus according to claim 1, wherein the auxiliary information generation unit further includes:

a normalization unit configured to normalize norms of the plurality of auxiliary features; and a scaling unit configured to output the weighted sum multiplied by a scale factor calculated based on magnitudes of the norms before normalization to the audio signal processing unit, and the aggregation unit is configured to calculate a weighted sum of the plurality of normalized auxiliary features multiplied by the attentions corresponding to the plurality of auxiliary features calculated by the attention calculation unit.

5. The training apparatus according to claim 4, wherein the audio signal processing unit is configured to estimate the audio signal of the target speaker included in the mixed audio signal for training, and the update unit is configured to update parameters of neural networks to optimize an objective function based on attentions corresponding to the plurality of auxiliary features calculated by the attention calculation unit, preset desired values of attentions corresponding to the plurality of auxiliary features, the audio signal of the target speaker included in the mixed audio signal for training estimated by the audio signal processing unit, and a teacher signal of audio of the target speaker included in the mixed audio signal for training.

6. The training apparatus according to claim 4, further comprising a prediction unit configured to predict reliabilities of a plurality of signals relating to processing of the audio signal of the target speaker for training using a neural network based on the plurality of auxiliary features, wherein the audio signal processing unit is configured to estimate the audio signal of the target speaker included in the mixed audio signal for training, and the update unit is configured to update parameters of neural networks to optimize an objective function based on the reliabilities of the plurality of signals relating to processing of the audio signal of the target speaker for training predicted by the prediction unit, predetermined reliabilities of the plurality of signals relating to processing of the audio signal of the target speaker for training, the audio signal of the target speaker included in the mixed audio signal for training estimated by the audio signal processing unit, and a teacher signal of audio of the target speaker included in the mixed audio signal for training.

7. The training apparatus according to claim 1, wherein the audio signal processing unit is configured to estimate the audio signal of the target speaker included in the mixed audio signal for training, and the update unit is configured to update parameters of neural networks to optimize an objective function based on attentions corresponding to the plurality of auxiliary features calculated by the attention calculation unit, preset desired values of attentions corresponding to the plurality of auxiliary features, the audio signal of the target speaker included in the mixed audio signal for training estimated by the audio signal processing unit, and a teacher signal of audio of the target speaker included in the mixed audio signal for training.

8. The training apparatus according to claim 1, further comprising a prediction unit configured to predict reliabilities of a plurality of signals relating to processing of the audio signal of the target speaker for training using a neural network based on the plurality of auxiliary features, wherein the audio signal processing unit is configured to estimate the audio signal of the target speaker included in the mixed audio signal for training, and the update unit is configured to update parameters of neural networks to optimize an objective function based on the reliabilities of the plurality of signals relating to processing of the audio signal of the target speaker for training predicted by the prediction unit, predetermined reliabilities of the plurality of signals relating to processing of the audio signal of the target speaker for training, the audio signal of the target speaker included in the mixed audio signal for training estimated by the audio signal processing unit, and a teacher signal of audio of the target speaker included in the mixed audio signal for training.

* * * * *